(12) United States Patent
Tsai et al.

(10) Patent No.: US 8,817,385 B2
(45) Date of Patent: Aug. 26, 2014

(54) PHOTOGRAPHING OPTICAL LENS SYSTEM

(75) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 99 days.

(21) Appl. No.: 13/615,630

(22) Filed: Sep. 14, 2012

(65) Prior Publication Data

US 2013/0229718 A1    Sep. 5, 2013

(30) Foreign Application Priority Data

Mar. 3, 2012  (TW) .............................. 101107200 A

(51) Int. Cl.
G02B 13/00    (2006.01)

(52) U.S. Cl.
CPC ................................ G02B 13/0045 (2013.01)
USPC ......................................... 359/714; 359/764

(58) Field of Classification Search
USPC .......... 359/708, 713, 714, 746, 755, 756, 764
See application file for complete search history.

(56) References Cited

U.S. PATENT DOCUMENTS

| 7,869,142 | B2  |    | 1/2011  | Chen et al. |         |
|-----------|-----|----|---------|-------------|---------|
| 8,000,030 | B2  |    | 8/2011  | Tang        |         |
| 8,000,031 | B1  |    | 8/2011  | Tsai        |         |
| 2011/0273611 | A1 | * | 11/2011 | Matsusaka et al. | 348/345 |

FOREIGN PATENT DOCUMENTS

| JP | 2010-256608 A | 11/2010 |
|----|---------------|---------|
| JP | 2011-85733 A  | 4/2011  |
| TW | 201106040 A   | 2/2011  |
| TW | 201135304 A   | 10/2011 |

* cited by examiner

*Primary Examiner* — Darryl J Collins
*Assistant Examiner* — Gary O'Neill
(74) *Attorney, Agent, or Firm* — CKC & Partners Co., Ltd.

(57) ABSTRACT

A photographing optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with negative refractive power is made of plastic material, and has a concave object-side surface and a convex image-side surface. The fifth lens element with negative refractive power is made of plastic material, and has a concave object-side surface and a concave image-side surface. At least one surface of the fourth through fifth lens elements is aspheric, and the image-side surface of the fifth lens element changes from concave at the paraxial region to convex at the peripheral region.

22 Claims, 20 Drawing Sheets

US 8,817,385 B2

PHOTOGRAPHING OPTICAL LENS SYSTEM

RELATED APPLICATIONS

The application claims priority to Taiwan Application Serial Number 101107200, filed Mar. 3, 2012, which is herein incorporated by reference.

BACKGROUND

1. Technical Field

The present invention relates to a photographing optical lens system. More particularly, the present invention relates to a compact photographing optical lens system applicable to electronic products.

2. Description of Related Art

In recent years, with the popularity of mobile products with camera functionalities, the demand for miniaturizing an image lens system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact image lens system has gradually evolved toward the field of higher megapixels, there is an increasing demand for compact image lens system featuring better image quality.

A conventional compact image lens assembly employed in a portable electronic product mainly adopts a four lens elements structure. Due to the popularity of mobile products with high specification, such as smart phones and PDAs (Personal Digital Assistants), the pixel and image quality requirements of the compact image lens assembly have increased rapidly. However, the conventional four lens elements structure cannot satisfy the requirements of the compact image lens assembly.

Another conventional compact image lens assembly provides a five lens elements structure, wherein lens elements are the first through fifth lens elements in order from an object side to an image side. The image lens assembly with five lens elements can increase the image quality and resolving power thereof. However, only one of the fourth lens element and the fifth lens element has negative refractive power, so that the negative refractive power of the image lens assembly cannot be properly distributed and the sensitivity thereof cannot be reduced. Moreover, the principal point of the image lens assembly cannot be positioned away from the image plane for reducing the back focal length thereof due to the surface shape of the fourth lens element and the fifth lens element.

SUMMARY

According to one aspect of the present disclosure, a photographing optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with negative refractive power is made of plastic material, and has a concave object-side surface and a convex image-side surface, wherein at least one of the object-side surface and the image-side surface of the fourth lens element is aspheric. The fifth lens element with negative refractive power is made of plastic material, and has a concave object-side surface and a concave image-side surface, wherein at least one of the object-side surface and the image-side surface of the fifth lens element is aspheric, and the image-side surface of the fifth lens element changes from concave at the paraxial region to convex at the peripheral region. When a curvature radius of the object-side surface of the fifth lens element is R9, a curvature radius of the image-side surface of the fifth lens element is R10, a focal length of the photographing optical lens system is f, a focal length of the fourth lens element is f4, and a focal length of the fifth lens element is f5, the following relationships are satisfied:

$$-10 < R9/R10 < 0; \text{ and}$$

$$-2.8 < (f/f4) + (f/f5) < -0.85.$$

According to another aspect of the present disclosure, a photographing optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has positive refractive power. The fourth lens element with negative refractive power is made of plastic material, and has a concave object-side surface and a convex image-side surface, wherein at least one of the object-side surface and the image-side surface of the fourth lens element is aspheric. The fifth lens element with negative refractive power is made of plastic material, and has a concave object-side surface and a concave image-side surface, wherein at least one of the object-side surface and the image-side surface of the fifth lens element is aspheric, and the image-side surface of the fifth lens element changes from concave at the paraxial region to convex at the peripheral region. When a curvature radius of the object-side surface of the fifth lens element is R9, a curvature radius of the image-side surface of the fifth lens element is R10, a focal length of the first lens element is f1, and a focal length of the third lens element is f3, the following relationships are satisfied:

$$-10 < R9/R10 < 0; \text{ and}$$

$$0.3 < f3/f1 < 1.2.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
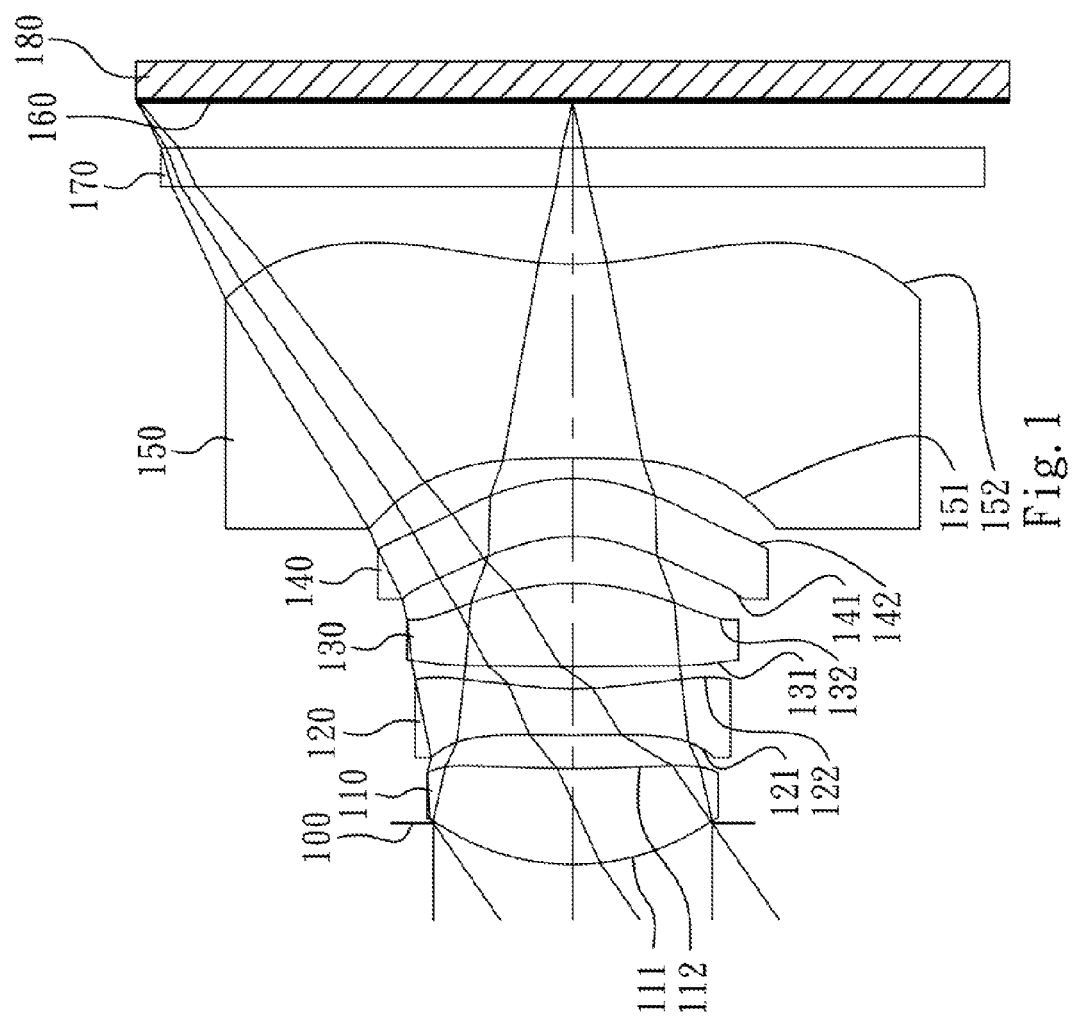
FIG. 1 is a schematic view of a photographing optical lens system according to the 1st embodiment of the present disclosure.

A photographing optical lens system includes, in order from an object side to an image side, a first lens element, a second lens element, a third lens element, a fourth lens element and a fifth lens element.

The first lens element with positive refractive power provides proper positive refractive power for the photographing optical lens system. The first lens element has a convex object-side surface, so that the positive refractive power of the first lens element can be properly adjusted for reducing the total track length of the photographing optical lens system.

The second lens element with negative refractive power can correct the aberration generated from the first lens element with positive refractive power.

The third lens element with positive refractive power can balance the positive refractive power of the first lens element for reducing the sensitivity of the photographing optical lens system, so that the image quality and the manufacture of the photographing optical lens system would be stable. The third lens element has a convex image-side surface can correct and adjust the positive refractive power of the third lens element.

The fourth lens element with negative refractive power has a concave object-side surface and a convex image-side surface, so that the astigmatism and the high order aberration of the photographing optical lens system can be corrected.

The fifth lens element with negative refractive power has a concave object-side surface and a concave image-side surface, so that the principal point of the photographing optical lens system can be positioned away from the image plane, and the total track length of the photographing optical lens system can be reduced so as to maintain the compact size of the photographing optical lens system. Furthermore, the image-side surface of the fifth lens element changes from concave at the paraxial region to convex at the peripheral region, so that the aberration of the off-axis field can be effectively corrected, and the resolving power of the photographing optical lens system can be enhanced.

Moreover, the fourth lens element and the fifth lens element have negative refractive power simultaneously, so that the sensitivity of the photographing optical lens system can be reduced for maintaining stable image quality and manufacture.

When a curvature radius of the object-side surface of the fifth lens element is R9, and a curvature radius of the image-side surface of the fifth lens element is R10, the following relationship is satisfied:

$$-10 < R9/R10 < 0.$$

Therefore, the back focal length of the photographing optical lens system can be reduced by properly adjusting the surface curvature of the fifth lens element.

R9 and R10 can further satisfy the following relationship:

$$-7.0 < R9/R10 < 0.$$

Moreover, R9 and R10 can satisfy the following relationship:

$$-5.0 < R9/R10 < 0.$$

When a focal length of the photographing optical lens system is f, a focal length of the fourth lens element is f4, and a focal length of the fifth lens element is f5, the following relationship is satisfied:

$$-2.8 < (f/f4) + (f/f5) < -0.85.$$

Therefore, the negative refractive power of the fourth lens element and the fifth lens element are proper, so that the sensitivity of the photographing optical lens system can be reduced for maintaining stable image quality and manufacture.

When a curvature radius of the object-side surface of the third lens element is R5, and a curvature radius of the image-side surface of the third lens element is R6, the following relationship is satisfied:

$$0.4 < (R5+R6)/(R5-R6) < 2.5.$$

Therefore, the positive refractive power of the third lens element can be properly adjusted by adjusting the surface curvature thereof, so that the sensitivity of the photographing optical lens system can be reduced, and the spherical aberration can also be corrected.

When the focal length of the photographing optical lens system is f, and a focal length of the third lens element is f3, the following relationship is satisfied:

$$1.1 < f/f3 < 2.5.$$

By such arrangement, the positive refractive power of the third lens element is proper, so that the total track length and the sensitivity of the photographing optical lens system can be reduced. Therefore, the photographing optical lens system is applicable to the compact electronic product, and has the stable image quality and manufacture.

The photographing optical lens system further includes a stop. When an axial distance between the stop and the image-side surface of the fifth lens element is SD, and an axial distance between the object-side surface of the first lens element and the image-side surface of the fifth lens element is TD, the following relationship is satisfied:

$$0.65 < SD/TD < 1.15.$$

Therefore, the photographing optical lens system has a favorable balance between the telecentric and wide-angle characteristics, and a desirable field of view of the photographing optical lens system can be maintained, and the total track length thereof would not be excessive.

When a focal length of the first lens element is f1, the focal length of the third lens element is f3, and the following relationship is satisfied:

$$0.3 < f3/f1 < 1.2.$$

Therefore, the sensitivity of the photographing optical lens system can be reduced for each positive lens element of the photographing optical lens system by balancing the positive refractive power of the first and third lens elements.

When an Abbe number of the first lens element is V1, an Abbe number of the second lens element is V2, and an Abbe number of the fourth lens element is V4, the following relationships are satisfied:

$$27 < V1 - V2 < 45; \text{ and}$$

$$-10 < V1 - (V2 + V4) < 23.$$

Therefore, the chromatic aberration of the photographing optical lens system can be corrected.

When the focal length of the photographing optical lens system is f, and the focal length of the fourth lens element is f4, the following relationship is satisfied:

$$-1.1 < f/f4 < 0.$$

Therefore, the sensitivity and the high order aberration of the photographing optical lens system can be reduced by properly adjusting the refractive power of the fourth lens element.

When the focal length of the fourth lens element is f4, and fi is a focal length of the i-th lens element, wherein i is 1, 2, 3 or 5, the following relationship is satisfied:

$$|f4| > |fi|, i=1,2,3,5.$$

Therefore, the sensitivity and the aberration of the photographing optical lens system can be reduced.

When a curvature radius of the image-side surface of the third lens element is R6, and a curvature radius of the object-side surface of the fourth lens element is R7, the following relationship is satisfied:

$$0 < R7/R6 < 0.9.$$

Therefore, the aberration generated from the third lens element and the photographing optical lens system can be corrected by the fourth lens element, and the resolving power can be enhanced by properly adjusting the refractive power of the third lens element and the fourth lens element.

When an axial distance between the object-side surface of the first lens element and an image plane is TTL, and a maximum image height of the photographing optical lens system is ImgH, the following relationship is satisfied:

$$TTL/ImgH < 1.9.$$

Therefore, the total track length of the photographing optical lens system can be reduced so as to maintain the compact size of the photographing optical lens system for portable electronic products.

According to the photographing optical lens system of the present disclosure, the lens elements thereof can be made of glass or plastic material.

When the lens elements are made of glass material, the distribution of the refractive power of the photographing optical lens system may be more flexible to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the photographing optical lens system can also be reduced.

According to the photographing optical lens system of the present disclosure, when the lens element has a convex surface, it indicates that the paraxial region of the surface is convex; and when the lens element has a concave surface, it indicates that the paraxial region of the surface is concave.

According to the photographing optical lens system of the present disclosure, the photographing optical lens system can include at least one stop, such as an aperture stop, glare stop, field stop, etc. Said glare stop or said field stop is allocated for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-10th specific embodiments are provided for further explanation.

1st Embodiment

Figure 2:
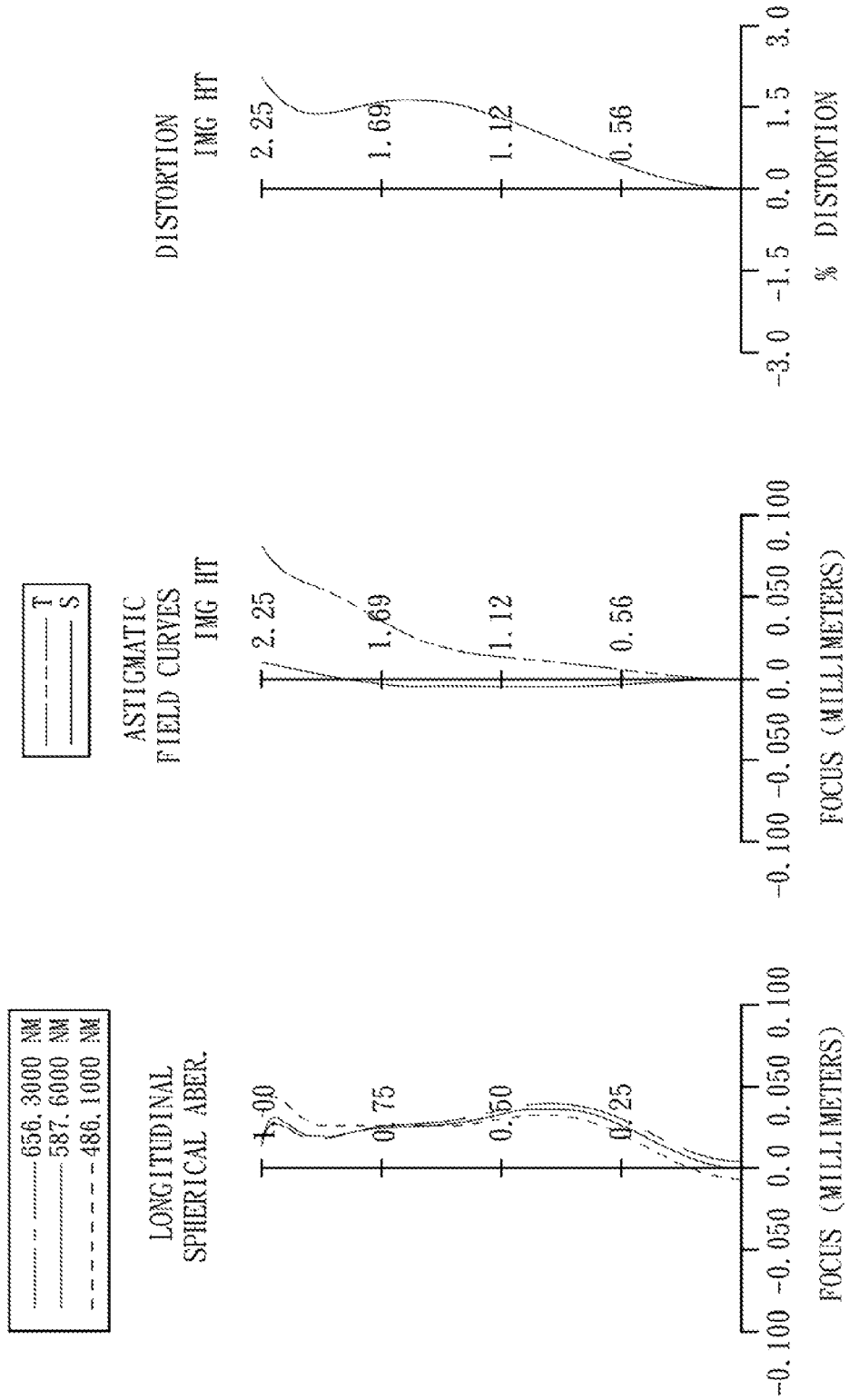
FIG. 2 shows spherical aberration curves, astigmatic field curves and a distortion curve of the photographing optical lens system according to the 1st embodiment.

FIG. 1 is a schematic view of a photographing optical lens system according to the 1st embodiment of the present disclosure. FIG. 2 shows spherical aberration curves, astigmatic field curves and a distortion curve of the photographing optical lens system according to the 1st embodiment. In FIG. 1, the photographing optical lens system includes, in order from an object side to an image side, an aperture stop 100, the first lens element 110, the second lens element 120, the third lens element 130, the fourth lens element 140, the fifth lens element 150, an IR-cut filter 170, an image plane 160 and an image sensor 180.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a concave object-side surface 151 and a concave image-side surface 152, and is made of plastic material. The object-side surface 151 and the image-side surface 152 of the fifth lens element 150 are aspheric. Furthermore, the image-side surface 152 of the fifth lens element 150 changes from concave at the paraxial region to convex at the peripheral region The IR-cut filter 170 is made of glass, and located between the fifth lens element 150 and the image plane 160, and will not affect the focal length of the photographing optical lens system.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

wherein,

X is the distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the photographing optical lens system according to the 1st embodiment, when a focal length of the photographing optical lens system is f, an f-number of the photographing optical lens system is Fno, and half of the maximal field of view is HFOV, these parameters have the following values:

f=3.16 mm;

Fno=2.20; and

HFOV=34.7 degrees.

In the photographing optical lens system according to the 1st embodiment, when an Abbe number of the first lens element 110 is V1, an Abbe number of the second lens element 120 is V2, and an Abbe number of the fourth lens element 140 is V4, the following relationships are satisfied:

$V1-V2=32.6$; and $V1-(V2+V4)=9.3$.

In the photographing optical lens system according to the 1st embodiment, when a curvature radius of the object-side surface 131 of the third lens element 130 is R5, a curvature radius of the image-side surface 132 of the third lens element 130 is R6, a curvature radius of the object-side surface 141 of the fourth lens element 140 is R5, a curvature radius of the object-side surface 151 of the fifth lens element 150 is R9, and a curvature radius of the image-side surface 152 of the fifth lens element 150 is R10, the following relationships are satisfied:

$(R5+R6)/(R5-R6)=0.81$;

$R7/R6=0.60$; and $R9/R10=-5.06$.

In the photographing optical lens system according to the 1st embodiment, when the focal length of the photographing optical lens system is f, a focal length of the first lens element 110 is f1, a focal length of the third lens element 130 is f3, a focal length of the fourth lens element 140 is f4, and a focal length of the fifth lens element 150 is f5, the following relationships are satisfied:

$f/f3=1.40$;

$f/f4=-0.05$;

$f3/f1=0.80$; and $(f/f4)+(f/f5)=-1.19$.

In the photographing optical lens system according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following relationship is satisfied:

$SD/TD=0.93$.

In the photographing optical lens system according to the 1st embodiment, when an axial distance between the object-side surface 111 of the first lens element 110 and the image plane 160 is TTL, and a maximum image height of the photographing optical lens system is ImgH which here is a half of the diagonal length of the photosensitive area of the image sensor 180 on the image plane 160, the following relationship is satisfied:

$TTL/ImgH=1.72$.

In the photographing optical lens system according to the 1st embodiment, when the focal length of the fourth lens element is f4, and fi is a focal length of the i-th lens element, wherein i is 1, 2, 3 or 5, the following relationship is satisfied:

$|f4|>|fi|$, $i=1,2,3,5$.

The detailed optical data of the 1st embodiment are shown in Table 1 and the aspheric surface data are shown in Table 2 below.

TABLE 1

1st Embodiment
f = 3.16 mm, Fno = 2.20, HFOV = 34.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.212 | | | | |
| 2 | Lens 1 | 1.270 (ASP) | 0.497 | Plastic | 1.544 | 55.9 | 2.83 |
| 3 | | 6.301 (ASP) | 0.169 | | | | |
| 4 | Lens 2 | 6.829 (ASP) | 0.240 | Plastic | 1.640 | 23.3 | −4.31 |

TABLE 1-continued

1st Embodiment
f = 3.16 mm, Fno = 2.20, HFOV = 34.7 deg.

| Surface # | | Curvature Radius | Thickness | Material | Index | Abbe # | Focal length |
|---|---|---|---|---|---|---|---|
| 5 | | 1.937 (ASP) | 0.117 | | | | |
| 6 | Lens 3 | 12.908 (ASP) | 0.425 | Plastic | 1.544 | 55.9 | 2.26 |
| 7 | | −1.340 (ASP) | 0.245 | | | | |
| 8 | Lens 4 | −0.801 (ASP) | 0.297 | Plastic | 1.640 | 23.3 | −68.36 |
| 9 | | −0.934 (ASP) | 0.105 | | | | |
| 10 | Lens 5 | −9.363 (ASP) | 1.000 | Plastic | 1.544 | 55.9 | −2.75 |
| 11 | | 1.850 (ASP) | 0.400 | | | | |
| 12 | IR-cut filter | Plano | 0.200 | Glass | 1.517 | 64.2 | — |
| 13 | | Plano | 0.245 | | | | |
| 14 | Image | Plano | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | 5.1201E−01 | 2.0605E+00 | −5.0251E+00 | −1.4652E+01 | −2.5859E+01 |
| A4 = | −6.2634E−02 | −1.1443E−01 | −5.9601E−01 | −2.9037E−01 | −1.4274E−01 |
| A6 = | 3.3366E−01 | −3.2925E−03 | 6.5348E−01 | 5.1397E−01 | 4.8759E−02 |
| A8 = | −1.2087E+00 | 3.3384E−01 | −7.1405E−01 | −4.7797E−01 | 6.8035E−01 |
| A10 = | 1.7837E+00 | −9.3256E−01 | −6.4210E−01 | −1.0257E−02 | −2.0206E−01 |
| A12 = | −2.6578E−01 | −6.4624E−01 | −4.5829E−01 | −1.2010E−02 | −1.6940E+00 |
| A14 = | −1.4697E+00 | 4.1673E−01 | 1.0984E+00 | −3.5308E−03 | 2.8860E+00 |
| A16 = | | | | | −1.9127E+00 |

| | Surface # | | | | |
|---|---|---|---|---|---|
| | 7 | 8 | 9 | 10 | 11 |
| k = | 3.0123E−01 | −1.9594E+00 | −7.6832E−01 | −1.3402E+01 | −1.0131E+01 |
| A4 = | 6.7097E−02 | 2.2655E−01 | 2.3688E−01 | −3.5330E−01 | −1.1130E−01 |
| A6 = | 5.4985E−02 | −3.6343E−01 | −1.3167E−01 | 1.0374E−01 | 5.4746E−02 |
| A8 = | 1.0554E−01 | 9.6867E−01 | 2.1786E−01 | 3.4265E−01 | −2.4847E−02 |
| A10 = | 5.2889E−01 | −1.0445E+00 | 7.9913E−02 | −2.2294E−02 | 6.5472E−03 |
| A12 = | −4.5973E−01 | 1.8527E−01 | −1.7207E−01 | −2.6897E−02 | −9.3365E−04 |
| A14 = | 7.5081E−02 | 3.3075E−01 | −1.3861E−01 | −1.6869E−02 | 8.0784E−06 |
| A16 = | 4.2426E−03 | −4.2430E−01 | 1.2263E−01 | 2.4102E−02 | 1.1641E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
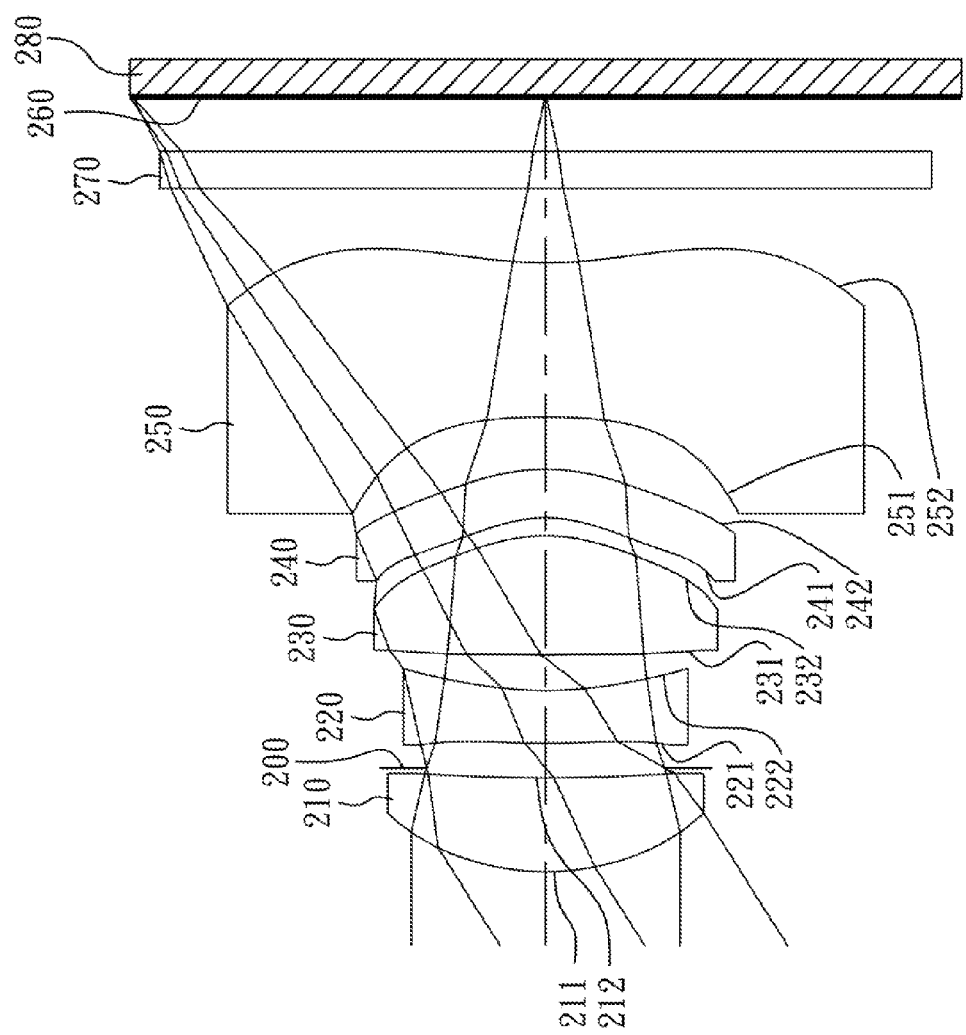
FIG. 3 is a schematic view of a photographing optical lens system according to the 2nd embodiment of the present disclosure.
Figure 4:
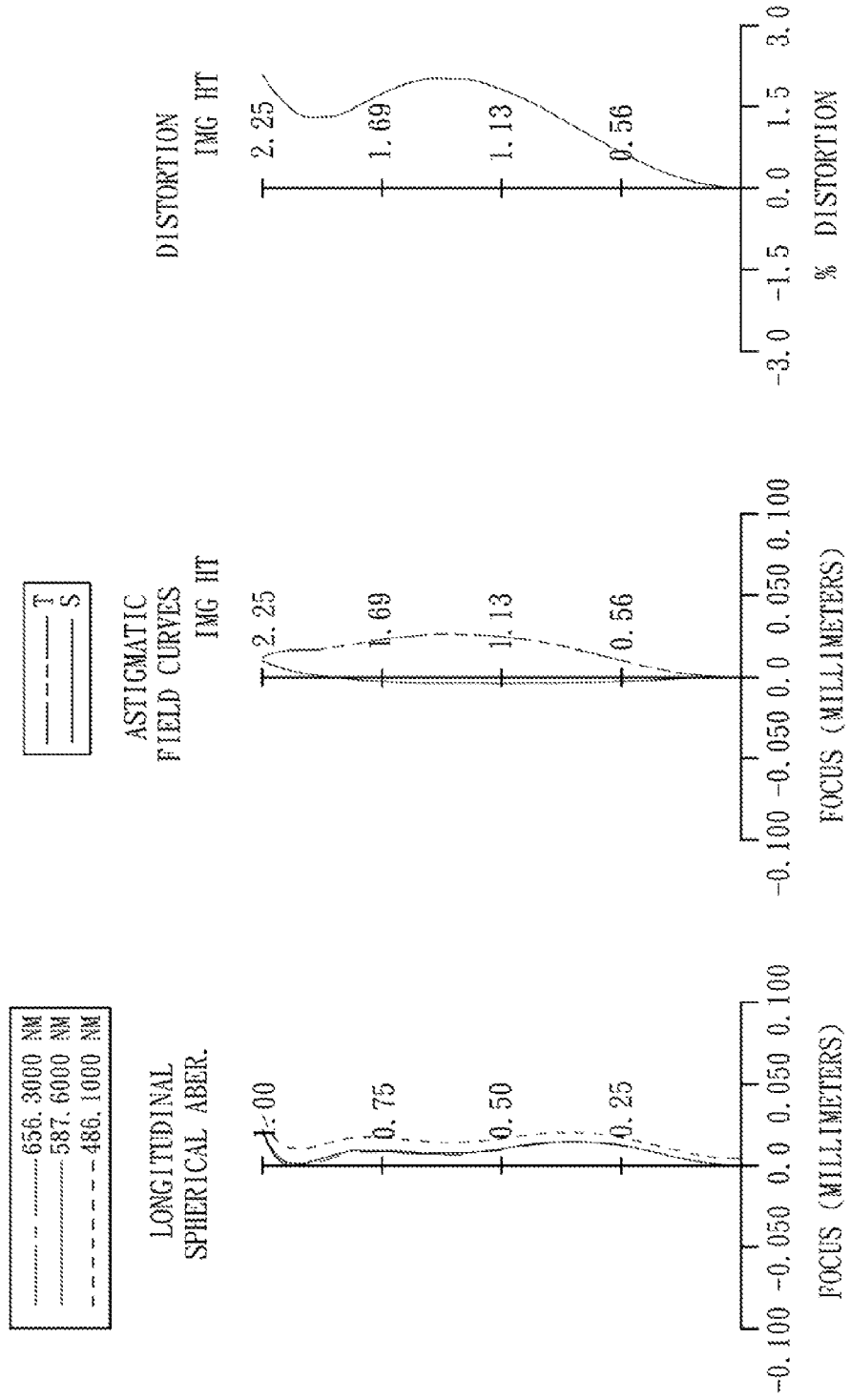
FIG. 4 shows spherical aberration curves, astigmatic field curves and a distortion curve of the photographing optical lens system according to the 2nd embodiment.

FIG. 3 is a schematic view of a photographing optical lens system according to the 2nd embodiment of the present disclosure. FIG. 4 shows spherical aberration curves, astigmatic field curves and a distortion curve of the photographing optical lens system according to the 2nd embodiment. In FIG. 3, the photographing optical lens system includes, in order from an object side to an image side, the first lens element 210, an aperture stop 200, the second lens element 220, the third lens element 230, the fourth lens element 240, the fifth lens element 250, an IR-cut filter 270, an image plane 260 and an image sensor 280.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a convex object-side surface 231 and a convex image-side surface 232, and is made of plastic material. The object-side surface 231 and the image-side surface 232 of the third lens element 230 are aspheric.

The fourth lens element 240 with negative refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a concave object-side surface 251 and a concave image-side surface 252, and is made of plastic material. The object-side surface 251 and the image-side surface 252 of the fifth lens element 250 are aspheric. Furthermore, the image-side surface 252 of the fifth lens element 250 changes from concave at the paraxial region to convex at the peripheral region The IR-cut filter 270 is made of glass, and located between the fifth lens element 250 and the image plane 260, and will not affect the focal length of the photographing optical lens system.

The detailed optical data of the 2nd embodiment are shown in Table 3 and the aspheric surface data are shown in Table 4 below.

In the image lens assembly according to the 2nd embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 2nd embodiment. Moreover, these parameters can be calculated from Table 3 and Table 4 as the following values and satisfy the following relationships:

| f (mm) | 3.47 | R9/R10 | −1.63 |
|---|---|---|---|
| Fno | 2.40 | f/f3 | 2.15 |
| HFOV (deg.) | 32.4 | f/f4 | −0.73 |
| V1 − V2 | 32.6 | f3/f1 | 0.53 |
| V1 − (V2 + V4) | 9.3 | (f/f4) + (f/f5) | −2.05 |
| (R5 + R6)/(R5 − R6) | 0.83 | SD/TD | 0.83 |
| R7/R6 | 0.76 | TTL/ImgH | 1.84 |

TABLE 3

2nd Embodiment
f = 3.47 mm, Fno = 2.40, HFOV = 32.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.391 (ASP) | 0.508 | Plastic | 1.544 | 55.9 | 3.02 |
| 2 | | 7.954 (ASP) | 0.054 | | | | |
| 3 | Ape. Stop | Plano | 0.137 | | | | |
| 4 | Lens 2 | 4.737 (ASP) | 0.281 | Plasitc | 1.640 | 23.3 | −4.74 |
| 5 | | 1.806 (ASP) | 0.194 | | | | |
| 6 | Lens 3 | 10.327 (ASP) | 0.645 | Plastic | 1.544 | 55.9 | 1.61 |
| 7 | | −0.935 (ASP) | 0.100 | | | | |
| 8 | Lens 4 | −0.710 (ASP) | 0.260 | Plastic | 1.640 | 23.3 | −4.78 |
| 9 | | −1.057 (ASP) | 0.283 | | | | |
| 10 | Lens 5 | −3.861 (ASP) | 0.839 | Plastic | 1.535 | 56.3 | −2.62 |
| 11 | | 2.366 (ASP) | 0.400 | | | | |
| 12 | IR-cut filter | Plano | 0.200 | Glass | 1.517 | 64.2 | — |
| 13 | | Plano | 0.299 | | | | |
| 14 | Image | Plano | — | | | | |

Note:
Reference wavelength (d-line) is 587.6 nm.

TABLE 4

Aspheric Coefficients

| | Surface # | | | | |
|---|---|---|---|---|---|
| | 1 | 2 | 4 | 5 | 6 |
| k = | 7.3270E−01 | −2.1749E+01 | −1.0000E+00 | −3.7331E+00 | 3.0000E+00 |
| A4 = | −4.5182E−02 | −7.9929E−02 | −4.0665E−01 | −2.9371E−01 | −1.1916E−01 |
| A6 = | 1.6646E−01 | 1.3697E−01 | 5.4112E−01 | 6.3047E−01 | 5.0584E−02 |
| A8 = | −6.4062E−01 | 1.4322E−01 | −6.4631E−01 | −4.9780E−01 | 4.8359E−01 |
| A10 = | 1.2895E+00 | −3.1997E−01 | 6.1596E−01 | −5.4828E−02 | −3.2792E−01 |
| A12 = | −1.2323E+00 | −6.0167E−01 | −1.3258E+00 | 2.7868E−01 | −1.5689E+00 |
| A14 = | 4.3612E−01 | 1.0544E+00 | 6.8644E−01 | −1.0020E−01 | 3.0315E+00 |
| A16 = | | | | | −1.6482E+00 |

| | Surface # | | | | |
|---|---|---|---|---|---|
| | 7 | 8 | 9 | 10 | 11 |
| k = | −1.1358E−01 | −2.2190E+00 | −1.2030E+00 | −1.3384E+00 | −1.3017E+01 |
| A4 = | 4.7597E−01 | 5.4011E−01 | 3.4665E−01 | −3.3107E−01 | −1.1494E−01 |
| A6 = | −2.8099E−02 | −5.8427E−01 | −3.5340E−01 | 1.0374E−01 | 5.2351E−02 |
| A8 = | −7.2415E−02 | 6.4183E−01 | 1.8021E−01 | −6.4843E−02 | −2.4907E−02 |
| A10 = | 1.4124E−01 | −8.6029E−01 | 5.8915E−02 | −5.9825E−02 | 6.5572E−03 |
| A12 = | −5.6696E−01 | 2.4896E−01 | −9.9669E−02 | 4.4344E−02 | −9.1147E−04 |
| A14 = | 1.4460E−01 | 2.8557E−01 | −5.9602E−02 | −4.3851E−03 | 2.8871E−05 |
| A16 = | 3.4678E−01 | −3.3587E−01 | 5.0325E−02 | −5.0551E−04 | 9.1597E−06 |

Moreover, in Table 3, the focal lengths of the first 210 through fifth lens element 250 satisfy the following relationship: $|f4|>|fi|$, $i=1, 2, 3, 5$.

3rd Embodiment

Figure 5:
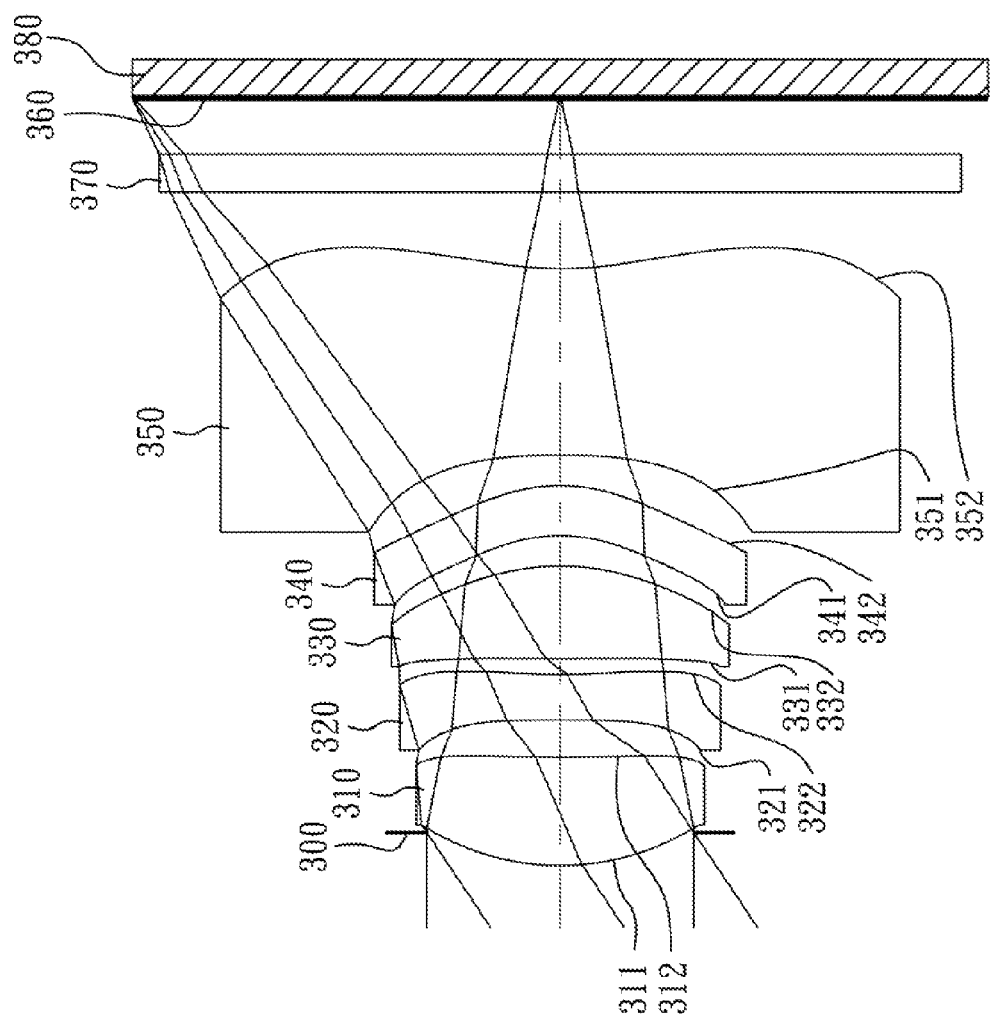
FIG. 5 is a schematic view of a photographing optical lens system according to the 3rd embodiment of the present disclosure.
Figure 6:
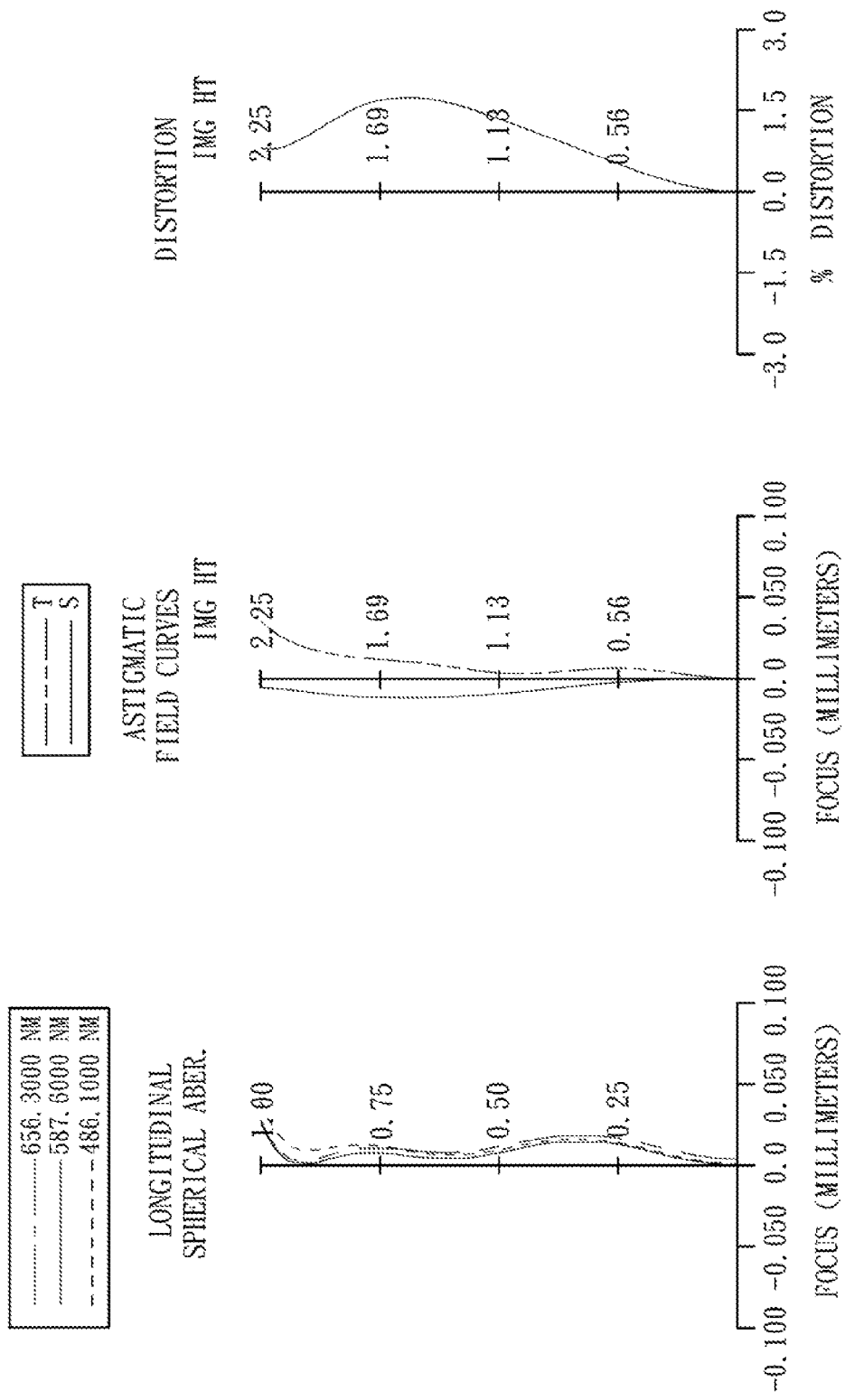
FIG. 6 shows spherical aberration curves, astigmatic field curves and a distortion curve of the photographing optical lens system according to the 3rd embodiment.

FIG. 5 is a schematic view of a photographing optical lens system according to the 3rd embodiment of the present disclosure. FIG. 6 shows spherical aberration curves, astigmatic field curves and a distortion curve of the photographing optical lens system according to the 3rd embodiment. In FIG. 5, the photographing optical lens system includes, in order from an object side to an image side, an aperture stop 300, the first lens element 310, the second lens element 320, the third lens element 330, the fourth lens element 340, the fifth lens element 350, an IR-cut filter 370, an image plane 360 and an image sensor 380.

The first lens element 310 with positive refractive power has a convex object-side surface 311 and a concave image-side surface 312, and is made of plastic material. The object-side surface 311 and the image-side surface 312 of the first lens element 310 are aspheric.

The second lens element 320 with negative refractive power has a concave object-side surface 321 and a concave image-side surface 322, and is made of plastic material. The object-side surface 321 and the image-side surface 322 of the second lens element 320 are aspheric.

The third lens element 330 with positive refractive power has a convex object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a concave object-side surface 351 and a concave image-side surface 352, and is made of plastic material. The object-side surface 351 and the image-side surface 352 of the fifth lens element 350 are aspheric. Furthermore, the image-side surface 352 of the fifth lens element 350 changes from concave at the paraxial region to convex at the peripheral region.

The IR-cut filter 370 is made of glass, and located between the fifth lens element 350 and the image plane 360, and will not affect the focal length of the photographing optical lens system.

The detailed optical data of the 3rd embodiment are shown in Table 5 and the aspheric surface data are shown in Table 6 below.

TABLE 5

3rd Embodiment
f = 3.30 mm, Fno = 2.35, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.174 | | | | |
| 2 | Lens 1 | 1.339 (ASP) | 0.573 | Plastic | 1.544 | 55.9 | 2.81 |
| 3 | | 9.230 (ASP) | 0.193 | | | | |
| 4 | Lens 2 | −30.769 (ASP) | 0.240 | Plastic | 1.650 | 21.4 | −4.53 |
| 5 | | 3.265 (ASP) | 0.082 | | | | |
| 6 | Lens 3 | 12.471 (ASP) | 0.488 | Plastic | 1.535 | 56.3 | 2.14 |
| 7 | | −1.240 (ASP) | 0.163 | | | | |
| 8 | Lens 4 | −0.781 (ASP) | 0.260 | Plastic | 1.650 | 21.4 | −32.76 |
| 9 | | −0.917 (ASP) | 0.160 | | | | |
| 10 | Lens 5 | −4.537 (ASP) | 0.985 | Plastic | 1.535 | 56.3 | −2.42 |
| 11 | | 1.944 (ASP) | 0.400 | | | | |
| 12 | IR-cut filter | Plano | 0.200 | Glass | 1.517 | 64.2 | — |
| 13 | | Plano | 0.298 | | | | |
| 14 | Image | Plano | — | | | | |

Note:
Reference wavelength (d-line) is 587.6 nm.

TABLE 6

Aspheric Coefficients

| | Surface # | | | | |
|---|---|---|---|---|---|
| | 2 | 3 | 4 | 5 | 6 |
| k = | 1.0881E+00 | −3.0000E+01 | −1.0000E+00 | −2.3635E+01 | 3.0000E+00 |
| A4 = | −8.4810E−02 | −9.0064E−02 | −4.5195E−01 | −4.0308E−01 | −2.1844E−01 |
| A6 = | 2.3750E−01 | −3.0391E−03 | 3.5623E−01 | 5.4841E−01 | 6.7512E−02 |
| A8 = | −1.1289E+00 | −5.1410E−02 | −4.3621E−01 | −4.1073E−01 | 6.0942E−01 |
| A10 = | 1.6792E+00 | −4.2111E−01 | −4.8250E−01 | −1.1316E−01 | −3.7456E−01 |
| A12 = | −5.0563E−01 | −3.1042E−01 | −5.3289E−01 | −1.5801E−02 | −1.7093E+00 |
| A14 = | −1.1140E+00 | 1.8819E−01 | 6.8644E−01 | −6.5271E−02 | 2.9070E+00 |
| A16 = | | | | | −1.7735E+00 |

TABLE 6-continued

Aspheric Coefficients

| Surface # | | | | |
|---|---|---|---|---|
| 7 | 8 | 9 | 10 | 11 |
| k = 1.3722E−01 | −1.9632E+00 | −9.7034E−01 | −1.2941E+01 | −1.0654E+01 |
| A4 = 1.4777E−01 | 2.9873E−01 | 2.9109E−01 | −3.3396E−01 | −1.0505E−01 |
| A6 = 3.1618E−03 | −4.5005E−01 | −2.2880E−01 | 1.0374E−01 | 5.3242E−02 |
| A8 = −4.2953E−02 | 7.8400E−01 | 2.3054E−01 | −2.4117E−02 | −2.4170E−02 |
| A10 = 2.7273E−01 | −9.5897E−01 | 7.4650E−02 | −1.8644E−02 | 6.3352E−03 |
| A12 = −4.4932E−01 | 1.8208E−01 | −1.9347E−01 | 1.6144E−02 | −9.1865E−04 |
| A14 = 9.1706E−02 | 3.2422E−01 | −1.5166E−01 | −5.4966E−03 | 2.6827E−05 |
| A16 = 6.8558E−02 | −4.8794E−01 | 1.6081E−01 | −2.7688E−02 | 5.9862E−06 |

In the image lens assembly according to the 3rd embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 3rd embodiment. Moreover, these parameters can be calculated from Table 5 and Table 6 as the following values and satisfy

| f (mm) | 3.30 | R9/R10 | −2.33 |
|---|---|---|---|
| Fno | 2.35 | f/f3 | 1.54 |
| HFOV (deg.) | 34.0 | f/f4 | −0.10 |
| V1 − V2 | 34.5 | f3/f1 | 0.76 |
| V1 − (V2 + V4) | 13.1 | (f/f4) + (f/f5) | −1.47 |
| (R5 + R6)/(R5 − R6) | 0.82 | SD/TD | 0.94 |
| R7/R6 | 0.63 | TTL/ImgH | 1.77 |

Moreover, in Table 5, the focal lengths of the first 310 through fifth lens element 350 satisfy the following relationship: $|f4| > |fi|$, i=1, 2, 3, 5.

4th Embodiment

Figure 7:
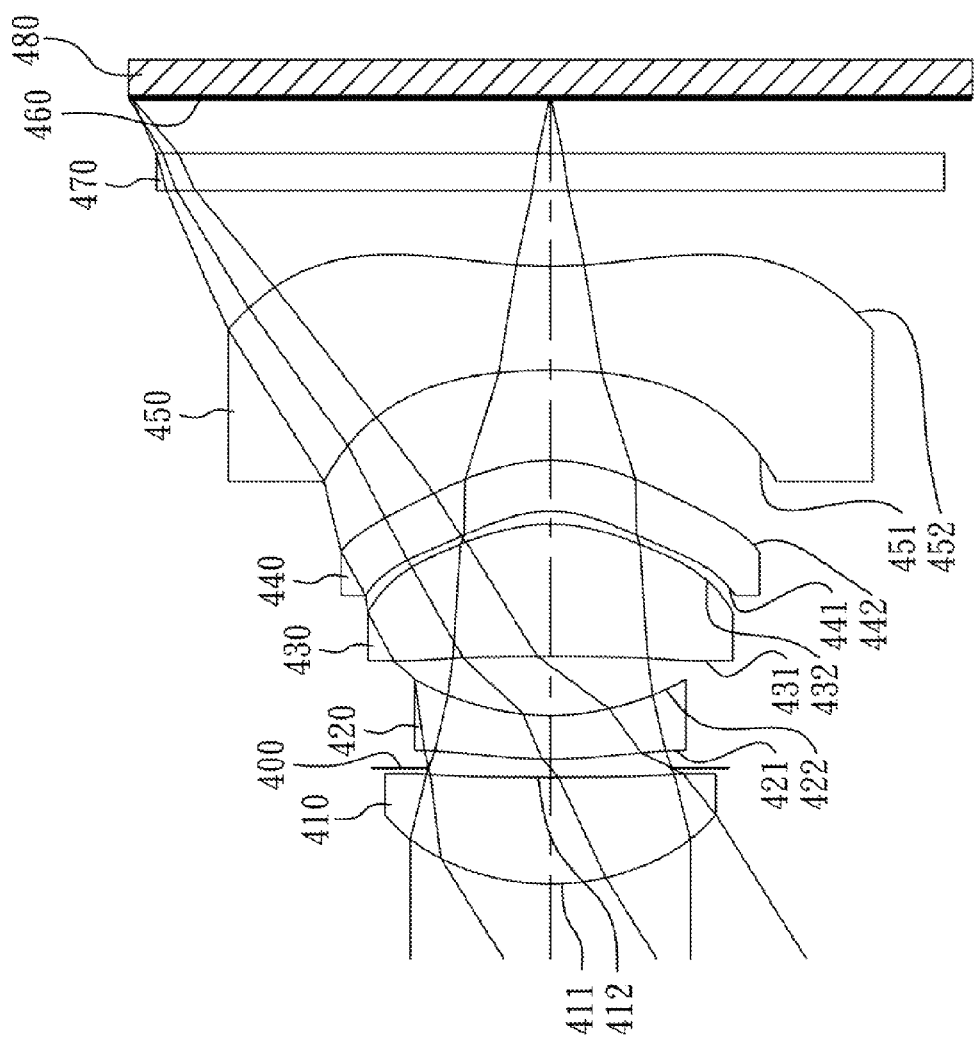
FIG. 7 is a schematic view of a photographing optical lens system according to the 4th embodiment of the present disclosure.
Figure 8:
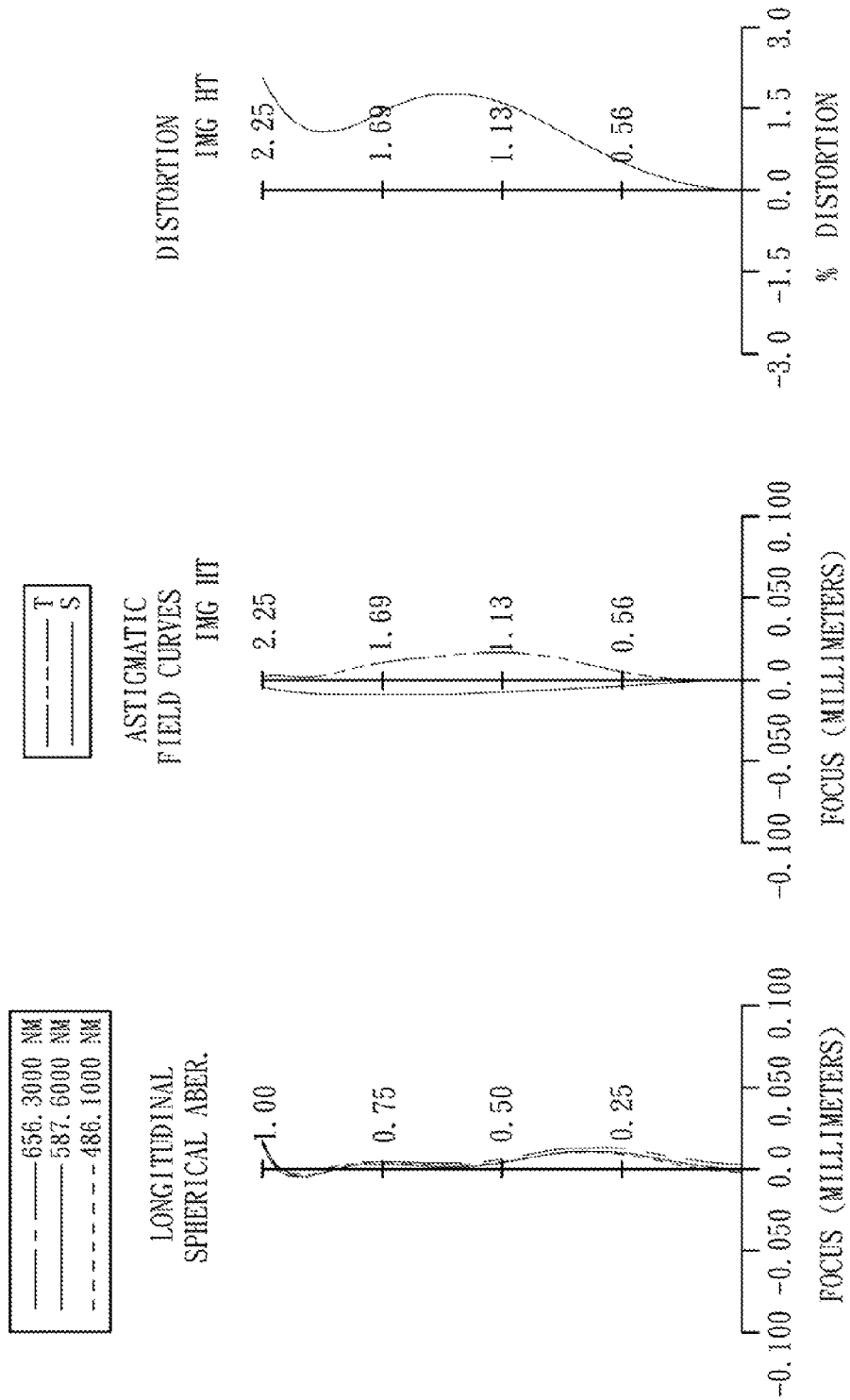
FIG. 8 shows spherical aberration curves, astigmatic field curves and a distortion curve of the photographing optical lens system according to the 4th embodiment.

FIG. 7 is a schematic view of a photographing optical lens system according to the 4th embodiment of the present disclosure. FIG. 8 shows spherical aberration curves, astigmatic field curves and a distortion curve of the photographing optical lens system according to the 4th embodiment. In FIG. 7, the photographing optical lens system includes, in order from an object side to an image side, the first lens element 410, an aperture stop 400, the second lens element 420, the third lens element 430, the fourth lens element 440, the fifth lens element 450, an IR-cut filter 470, an image plane 460 and an image sensor 480.

The first lens element 410 with positive refractive power has a convex object-side surface 411 and a concave image-side surface 412, and is made of plastic material. The object-side surface 411 and the image-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric.

The third lens element 430 with positive refractive power has a concave object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a concave object-side surface 451 and a concave image-side surface 452, and is made of plastic material. The object-side surface 451 and the image-side surface 452 of the fifth lens element 450 are aspheric. Furthermore, the image-side surface 452 of the fifth lens element 450 changes from concave at the paraxial region to convex at the peripheral region.

The IR-cut filter 470 is made of glass, and located between the fifth lens element 450 and the image plane 460, and will not affect the focal length of the photographing optical lens system.

The detailed optical data of the 4th embodiment are shown in Table 7 and the aspheric surface data are shown in Table 8 below.

TABLE 7

4th Embodiment
f = 3.51 mm, Fno = 2.35, HFOV = 32.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.343 (ASP) | 0.569 | Plastic | 1.530 | 55.8 | 2.72 |
| 2 | | 16.670 (ASP) | 0.050 | | | | |
| 3 | Ape. Stop | Plano | 0.050 | | | | |
| 4 | Lens 2 | 2.592 (ASP) | 0.230 | Plastic | 1.634 | 23.8 | −4.36 |
| 5 | | 1.291 (ASP) | 0.315 | | | | |
| 6 | Lens 3 | −23.529 (ASP) | 0.709 | Plastic | 1.530 | 55.8 | 1.74 |
| 7 | | −0.898 (ASP) | 0.070 | | | | |
| 8 | Lens 4 | −0.650 (ASP) | 0.268 | Plastic | 1.634 | 23.8 | −6.79 |
| 9 | | −0.889 (ASP) | 0.481 | | | | |
| 10 | Lens 5 | −3.260 (ASP) | 0.559 | Plastic | 1.530 | 55.8 | −2.62 |
| 11 | | 2.561 (ASP) | 0.400 | | | | |
| 12 | IR-cut filter | Plano | 0.200 | Glass | 1.517 | 64.2 | — |

TABLE 7-continued

4th Embodiment
f = 3.51 mm, Fno = 2.35, HFOV = 32.1 deg.

| Surface # | | Curvature Radius | Thickness | Material | Index | Abbe # | Focal length |
|---|---|---|---|---|---|---|---|
| 13 | | Plano | 0.298 | | | | |
| 14 | Image | Plano | — | | | | |

Note:
Reference wavelength (d-line) is 587.6 nm.

TABLE 8

Aspheric Coefficients

| | Surface # | | | | |
|---|---|---|---|---|---|
| | 1 | 2 | 4 | 5 | 6 |
| k = | 4.3938E−01 | −4.1491E+00 | 2.8248E+00 | −4.0068E−01 | −1.0000E+00 |
| A4 = | −2.2108E−02 | −6.2253E−02 | −3.4621E−01 | −2.2116E−01 | −6.2012E−02 |
| A6 = | 1.3926E−01 | 2.5820E−01 | 6.0785E−01 | 5.0214E−01 | −6.4822E−02 |
| A8 = | −5.3941E−01 | −9.8176E−02 | −1.0654E+00 | −5.5689E−01 | 3.8181E−01 |
| A10 = | 1.1985E+00 | −4.1454E−01 | 7.6189E−01 | 1.6188E−01 | −2.2094E−01 |
| A12 = | −1.2725E+00 | 3.7577E−01 | 6.8276E−02 | 5.9894E−01 | −1.3349E+00 |
| A14 = | 5.6540E−01 | 1.3727E−01 | −9.9371E−01 | −8.1245E−01 | 3.1465E+00 |
| A16 = | | | | | −1.9301E+00 |

| | Surface # | | | | |
|---|---|---|---|---|---|
| | 7 | 8 | 9 | 10 | 11 |
| k = | −2.4347E−01 | −1.8842E+00 | −1.3842E+00 | −3.0000E+01 | −1.8809E+01 |
| A4 = | 4.9483E−01 | 5.1531E−01 | 3.4390E−01 | −2.5532E−01 | −1.0789E−01 |
| A6 = | −7.3728E−02 | −5.9423E−01 | −3.7925E−01 | 1.0374E−01 | 4.3912E−02 |
| A8 = | −1.0330E−01 | 7.1729E−01 | 1.8304E−01 | −6.6657E−02 | −2.3616E−02 |
| A10 = | 1.6465E−01 | −8.4911E−01 | 7.4322E−02 | −9.3439E−03 | 7.0397E−03 |
| A12 = | −5.0452E−01 | 1.7205E−01 | −7.4502E−02 | 3.4060E−02 | −1.0756E−03 |
| A14 = | 1.5453E−01 | 2.6424E−01 | −4.9210E−02 | −1.9259E−02 | −2.3450E−05 |
| A16 = | 2.3884E−01 | −1.4581E−01 | 3.0015E−02 | 3.4670E−03 | 2.6831E−05 |

In the image lens assembly according to the 4th embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 4th embodiment. Moreover, these parameters can be calculated from Table 7 and Table 8 as the following values and satisfy the following relationships:

| f (mm) | 3.51 | R9/R10 | −1.27 |
|---|---|---|---|
| Fno | 2.35 | f/f3 | 2.01 |
| HFOV (deg.) | 32.1 | f/f4 | −0.52 |
| V1 − V2 | 32.0 | f3/f1 | 0.64 |
| V1 − (V2 + V4) | 8.2 | (f/f4) + (f/f5) | −1.86 |
| (R5 + R6)/(R5 − R6) | 1.08 | SD/TD | 0.81 |
| R7/R6 | 0.72 | TTL/ImgH | 1.84 |

Moreover, in Table 7, the focal lengths of the first 410 through fifth lens element 450 satisfy the following relationship: |f4|>|fi|, i=1, 2, 3, 5.

5th Embodiment

Figure 9:
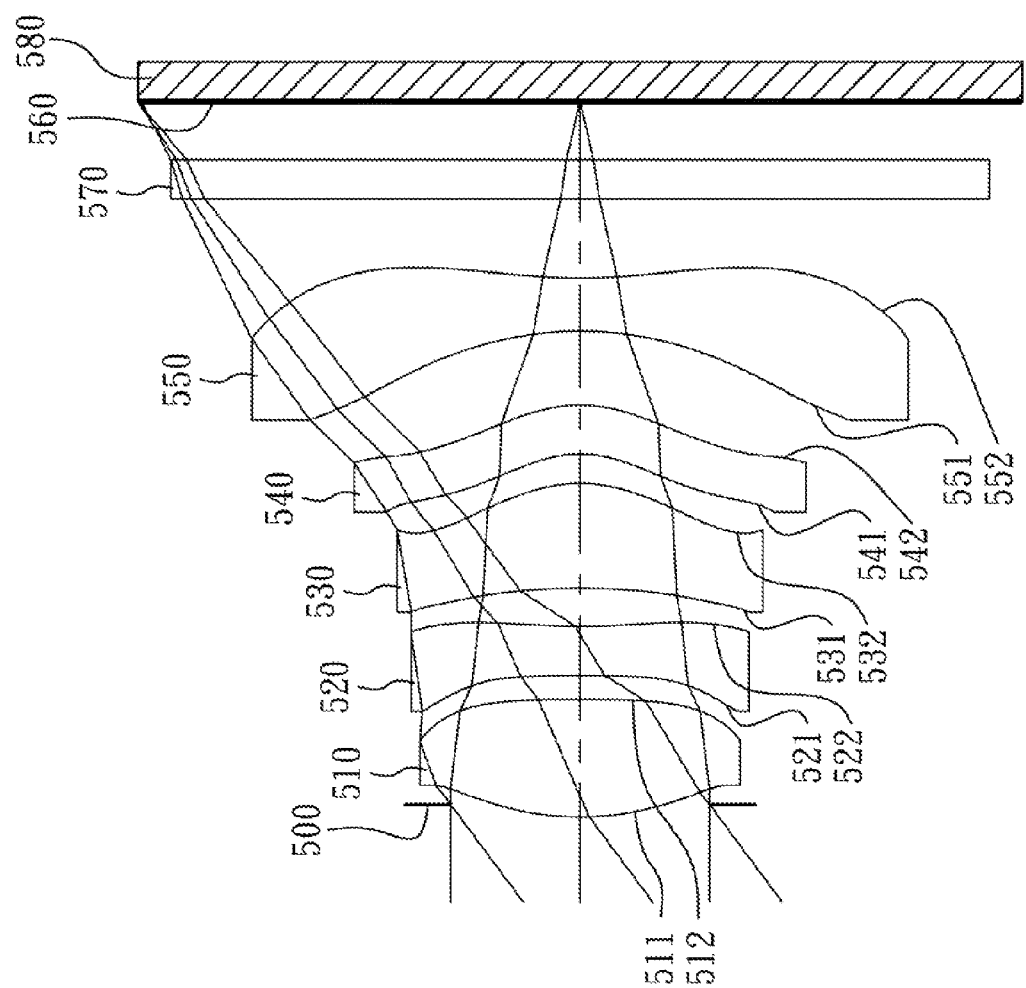
FIG. 9 is a schematic view of a photographing optical lens system according to the 5th embodiment of the present disclosure.
Figure 10:
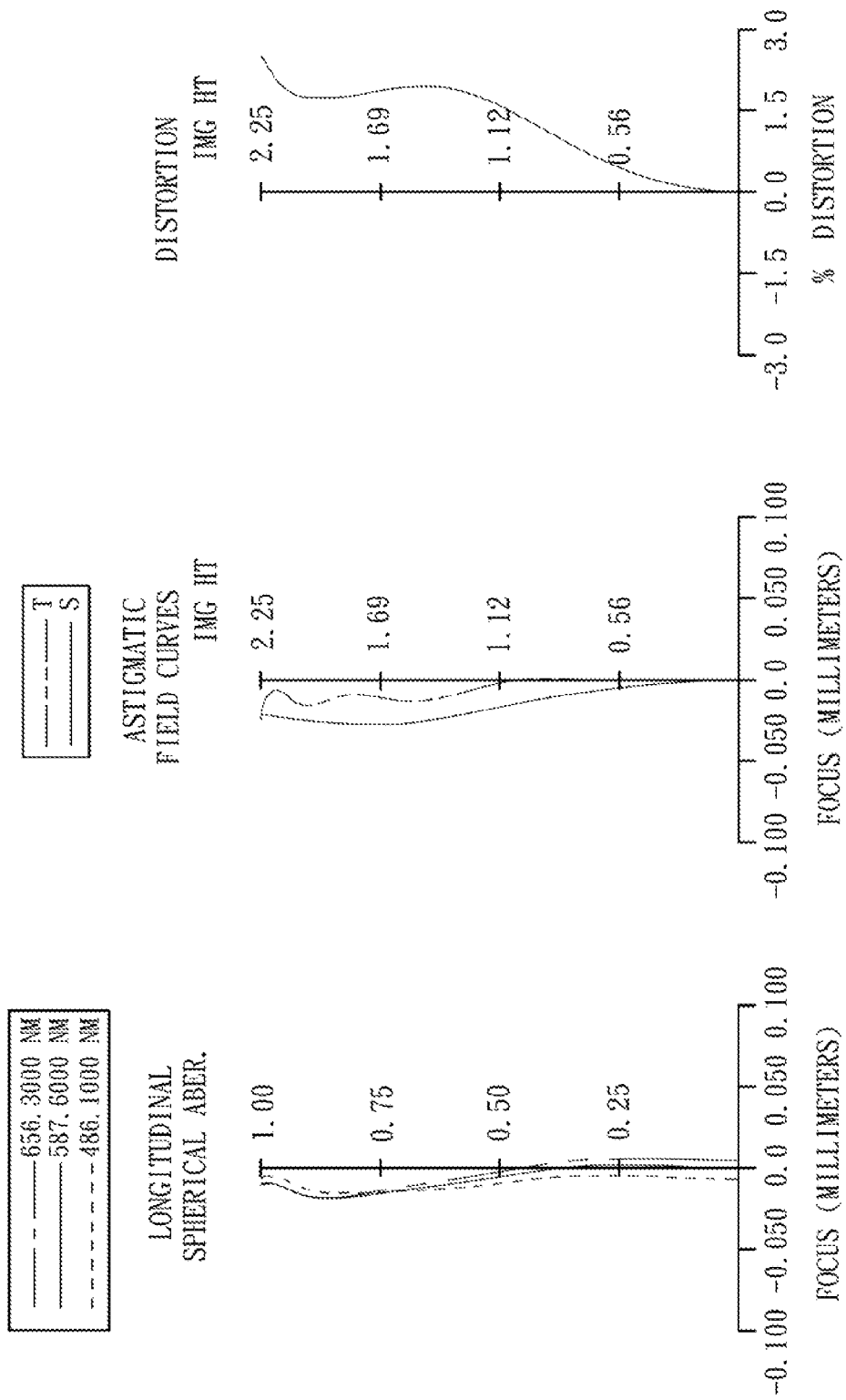
FIG. 10 shows spherical aberration curves, astigmatic field curves and a distortion curve of the photographing optical lens system according to the 5th embodiment.

FIG. 9 is a schematic view of a photographing optical lens system according to the 5th embodiment of the present disclosure. FIG. 10 shows spherical aberration curves, astigmatic field curves and a distortion curve of the photographing optical lens system according to the 5th embodiment. In FIG. 9, the photographing optical lens system includes, in order from an object side to an image side, an aperture stop 500, the first lens element 510, the second lens element 520, the third lens element 530, the fourth lens element 540, the fifth lens element 550, an IR-cut filter 570, an image plane 560 and an image sensor 580.

The first lens element 510 with positive refractive power has a convex object-side surface 511 and a convex image-side surface 512, and is made of plastic material. The object-side surface 511 and the image-side surface 512 of the first lens element 510 are aspheric.

The second lens element 520 with negative refractive power has a concave object-side surface 521 and a concave image-side surface 522, and is made of plastic material. The object-side surface 521 and the image-side surface 522 of the second lens element 520 are aspheric.

The third lens element 530 with positive refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a concave object-side surface 551 and a concave image-side surface 552, and is made of plastic material. The object-side surface 551 and the image-side surface 552 of the fifth lens element 550 are aspheric. Furthermore, the image-side surface 552 of the fifth lens element 550 changes from concave at the paraxial region to convex at the peripheral region.

The IR-cut filter 570 is made of glass, and located between the fifth lens element 550 and the image plane 560, and will not affect the focal length of the photographing optical lens system.

The detailed optical data of the 5th embodiment are shown in Table 9 and the aspheric surface data are shown in Table 10 below.

TABLE 9

5th Embodiment
f = 2.96 mm, Fno = 2.25, HFOV = 36.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.064 | | | | |
| 2 | Lens 1 | 1.442 | (ASP) | 0.599 | Plastic | 1.544 | 55.9 | 2.40 |
| 3 | | −11.627 | (ASP) | 0.123 | | | | |
| 4 | Lens 2 | −16.339 | (ASP) | 0.250 | Plastic | 1.640 | 23.3 | −4.48 |
| 5 | | 3.494 | (ASP) | 0.193 | | | | |
| 6 | Lens 3 | −4.057 | (ASP) | 0.535 | Plastic | 1.544 | 55.9 | 1.56 |
| 7 | | −0.734 | (ASP) | 0.150 | | | | |
| 8 | Lens 4 | −0.564 | (ASP) | 0.252 | Plastic | 1.640 | 23.3 | −16.68 |
| 9 | | −0.700 | (ASP) | 0.375 | | | | |
| 10 | Lens 5 | −1.547 | (ASP) | 0.272 | Plastic | 1.535 | 56.3 | −1.87 |
| 11 | | 3.011 | (ASP) | 0.400 | | | | |
| 12 | IR-cut filter | Plano | | 0.200 | Glass | 1.517 | 64.2 | — |
| 13 | | Plano | | 0.298 | | | | |
| 14 | Image | Plano | | — | | | | |

Note:
Reference wavelength (d-line) is 587.6 nm.

TABLE 10

Aspheric Coefficients

| | Surface # | | | | |
|---|---|---|---|---|---|
| | 2 | 3 | 4 | 5 | 6 |
| k = | −4.6836E−02 | −1.0000E+00 | −1.0000E+00 | −1.0000E+00 | −1.0000E+00 |
| A4 = | −2.7679E−02 | −2.4837E−01 | −5.1891E−01 | −3.3618E−01 | −1.7708E−01 |
| A6 = | 6.9995E−02 | 5.2886E−03 | 4.1284E−01 | 3.7315E−01 | 2.1283E−01 |
| A8 = | −6.4655E−01 | −4.9691E−01 | −1.3364E+00 | −6.6841E−01 | 2.0132E−01 |
| A10 = | 1.1805E+00 | −1.6125E−01 | 1.4980E+00 | 1.6637E−01 | −2.8528E−01 |
| A12 = | −7.5181E−01 | 1.3401E+00 | 4.2960E−01 | 1.0930E+00 | −1.2593E+00 |
| A14 = | −1.4520E+00 | −1.2624E+00 | −5.4713E−01 | −9.6038E−01 | 3.3463E+00 |
| A16 = | | | | | −2.3995E+00 |

| | Surface # | | | | |
|---|---|---|---|---|---|
| | 7 | 8 | 9 | 10 | 11 |
| k = | −4.8361E−01 | −2.1154E+00 | −2.2714E+00 | −1.4787E+01 | −2.6761E+00 |
| A4 = | 7.1081E−01 | 7.7463E−01 | 3.8183E−01 | −1.7619E−01 | −1.6920E−01 |
| A6 = | −1.9612E−01 | −8.5627E−01 | −2.9490E−01 | 1.0374E−01 | 8.6450E−02 |
| A8 = | 1.2767E−01 | 7.6737E−01 | 1.8264E−01 | −8.0881E−02 | −4.5127E−02 |
| A10 = | 3.6527E−01 | −6.4295E−01 | 4.7906E−02 | 4.8812E−02 | 1.3520E−02 |
| A12 = | −3.0407E−01 | 2.1451E−01 | −8.3066E−02 | 2.4041E−02 | −1.1631E−03 |
| A14 = | 2.1640E−01 | 1.9305E−01 | −4.4600E−02 | −3.1124E−02 | −5.0717E−04 |
| A16 = | −1.4490E−02 | −1.9234E−01 | 3.5534E−02 | 7.3240E−03 | 1.0284E−04 |

In the image lens assembly according to the 5th embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 2.96 | R9/R10 | −0.51 |
| Fno | 2.25 | f/f3 | 1.90 |
| HFOV (deg.) | 36.6 | f/f4 | −0.18 |
| V1 − V2 | 32.6 | f3/f1 | 0.65 |
| V1 − (V2 + V4) | 9.3 | (f/f4) + (f/f5) | −1.76 |
| (R5 + R6)/(R5 − R6) | 1.44 | SD/TD | 0.98 |
| R7/R6 | 0.77 | TTL/ImgH | 1.59 |

Moreover, in Table 9, the focal lengths of the first 510 through fifth lens element 550 satisfy the following relationship: $|f4|>|fi|$, i=1, 2, 3, 5.

6th Embodiment

Figure 11:
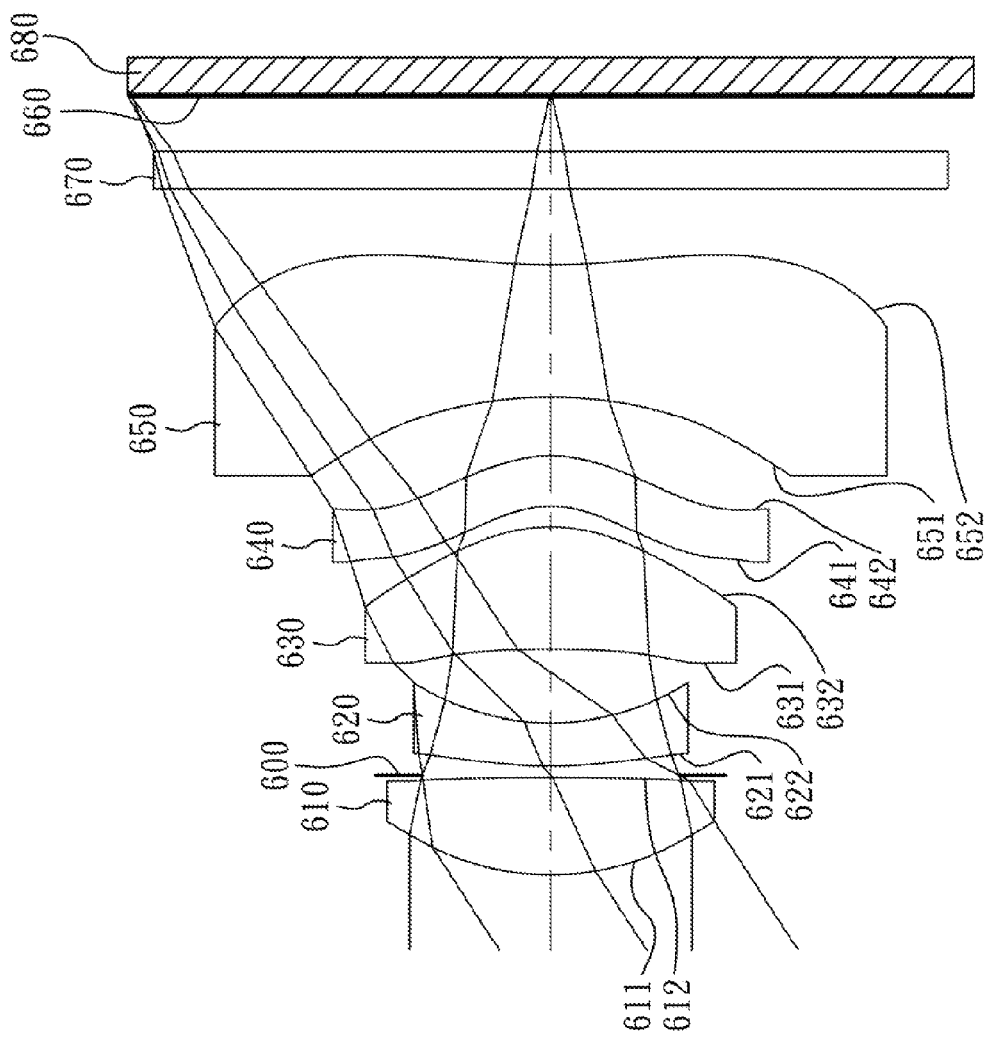
FIG. 11 is a schematic view of a photographing optical lens system according to the 6th embodiment of the present disclosure.
Figure 12:
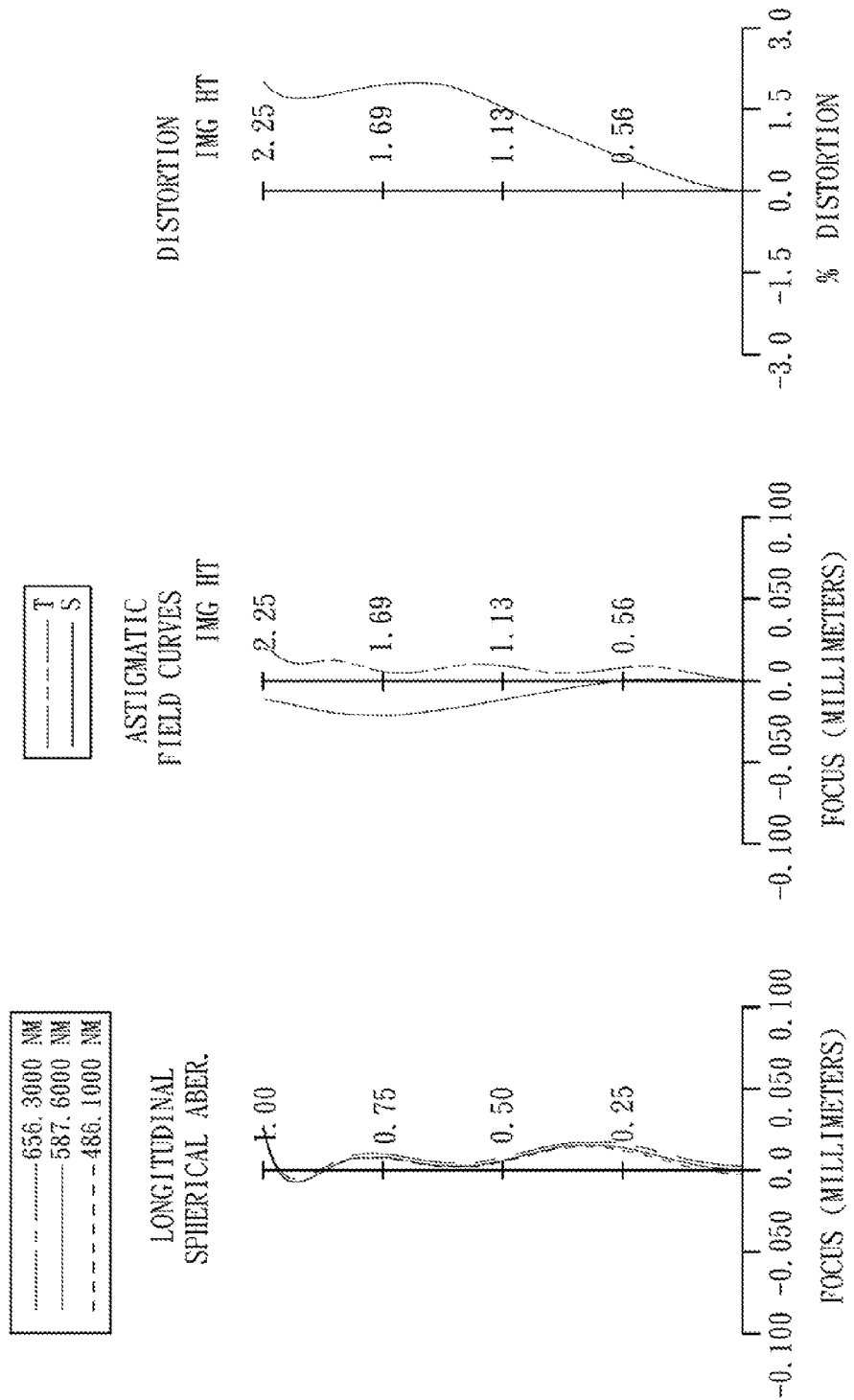
FIG. 12 shows spherical aberration curves, astigmatic field curves and a distortion curve of the photographing optical lens system according to the 6th embodiment.

FIG. 11 is a schematic view of a photographing optical lens system according to the 6th embodiment of the present disclosure. FIG. 12 shows spherical aberration curves, astigmatic field curves and a distortion curve of the photographing optical lens system according to the 6th embodiment. In FIG. 11, the photographing optical lens system includes, in order from an object side to an image side, the first lens element 610, an aperture stop 600, the second lens element 620, the third lens element 630, the fourth lens element 640, the fifth lens element 650, an IR-cut filter 670, an image plane 660 and an image sensor 680.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric.

The third lens element 630 with positive refractive power has a concave object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a concave object-side surface 651 and a concave image-side surface 652, and is made of plastic material. The object-side surface 651 and the image-side surface 652 of the fifth lens element 650 are aspheric. Furthermore, the image-side surface 652 of the fifth lens element 650 changes from concave at the paraxial region to convex at the peripheral region.

The IR-cut filter 670 is made of glass, and located between the fifth lens element 650 and the image plane 660, and will not affect the focal length of the photographing optical lens system.

The detailed optical data of the 6th embodiment are shown in Table 11 and the aspheric surface data are shown in Table 12 below.

TABLE 11

6th Embodiment
f = 3.38 mm, Fno = 2.25, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.418 (ASP) | 0.518 | Plastic | 1.544 | 55.9 | 2.47 |
| 2 | | −23.082 (ASP) | 0.012 | | | | |
| 3 | Ape. Stop | Plano | 0.050 | | | | |
| 4 | Lens 2 | 2.454 (ASP) | 0.230 | Plastic | 1.640 | 23.3 | −4.27 |
| 5 | | 1.245 (ASP) | 0.392 | | | | |
| 6 | Lens 3 | −6.136 (ASP) | 0.653 | Plastic | 1.535 | 56.3 | 1.71 |
| 7 | | −0.826 (ASP) | 0.110 | | | | |
| 8 | Lens 4 | −0.575 (ASP) | 0.265 | Plastic | 1.640 | 23.3 | −9.66 |
| 9 | | −0.748 (ASP) | 0.316 | | | | |
| 10 | Lens 5 | −2.328 (ASP) | 0.705 | Plastic | 1.535 | 56.3 | −2.45 |
| 11 | | 3.316 (ASP) | 0.400 | | | | |
| 12 | IR-cut filter | Plano | 0.200 | Glass | 1.517 | 64.2 | — |
| 13 | | Plano | 0.300 | | | | |
| 14 | Image | Plano | — | | | | |

Note:
Reference wavelength (d-line) is 587.6 nm.

TABLE 12

Aspheric Coefficients

| | Surface # | | | | |
|---|---|---|---|---|---|
| | 1 | 2 | 4 | 5 | 6 |
| k = | 1.2820E−01 | 3.0000E+00 | 2.8664E+00 | −3.9887E−01 | −1.0000E+00 |
| A4 = | −2.2329E−02 | −6.0867E−02 | −3.0149E−01 | −2.0855E−01 | −1.2022E−01 |
| A6 = | 1.5889E−01 | 2.6919E−01 | 7.3483E−01 | 5.4416E−01 | −1.4552E−01 |
| A8 = | −6.1734E−01 | −3.0253E−01 | −1.4908E+00 | −7.4348E−01 | 3.4075E−01 |
| A10 = | 1.0950E+00 | −4.5475E−01 | 1.2129E+00 | 4.6255E−01 | 3.2790E−02 |
| A12 = | −8.4937E−01 | 8.6573E−01 | 5.5038E−01 | 1.4673E+00 | −9.6660E−01 |

TABLE 12-continued

| Aspheric Coefficients | | | | |
|---|---|---|---|---|
| A14 = | 1.0709E−01 | −3.8936E−01 | −1.6307E+00 | −2.2904E+00 | 3.2534E+00 |
| A16 = | | | | | −2.6081E+00 |

| | Surface # | | | | |
|---|---|---|---|---|---|
| | 7 | 8 | 9 | 10 | 11 |
| k = | −3.9114E−01 | −1.7914E+00 | −1.9603E+00 | −1.9919E+01 | −1.9780E+01 |
| A4 = | 4.7794E−01 | 6.2975E−01 | 3.2783E−01 | −1.7012E−01 | −1.0391E−01 |
| A6 = | −1.8684E−01 | −6.8564E−01 | −2.7860E−01 | 1.0374E−01 | 6.5236E−02 |
| A8 = | 2.1114E−02 | 8.7870E−01 | 2.0094E−01 | −9.0495E−42 | −3.8931E−02 |
| A10 = | 3.0144E−01 | −6.9459E−01 | 5.9759E−02 | 4.7856E−02 | 1.1773E−02 |
| A12 = | −3.4463E−01 | 1.1757E−01 | −7.5639E−02 | 2.0989E−02 | −1.0769E−03 |
| A14 = | 1.9871E−01 | 1.6371E−01 | −4.4275E−02 | −3.2064E−02 | −2.8582E−04 |
| A16 = | 1.6196E−04 | −8.4804E−02 | 3.0149E−02 | 9.0587E−03 | 5.3411E−05 |

In the image lens assembly according to the 6th embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 6th embodiment. Moreover, these parameters can be calculated from Table 11 and Table 12 as the following values and satisfy the following relationships:

| f (mm) | 3.38 | R9/R10 | −0.70 |
|---|---|---|---|
| Fno | 2.25 | f/f3 | 1.97 |
| HFOV (deg.) | 33.1 | f/f4 | −0.35 |
| V1 − V2 | 32.6 | f3/f1 | 0.69 |
| V1 − (V2 + V4) | 9.3 | (f/f4) + (f/f5) | −1.73 |
| (R5 + R6)/(R5 − R6) | 1.31 | SD/TD | 0.84 |
| R7/R6 | 0.70 | TTL/ImgH | 1.82 |

Moreover, in Table 11, the focal lengths of the first 610 through fifth lens element 650 satisfy the following relationship: |f4|>|fi|, i=1, 2, 3, 5.

7th Embodiment

Figure 13:
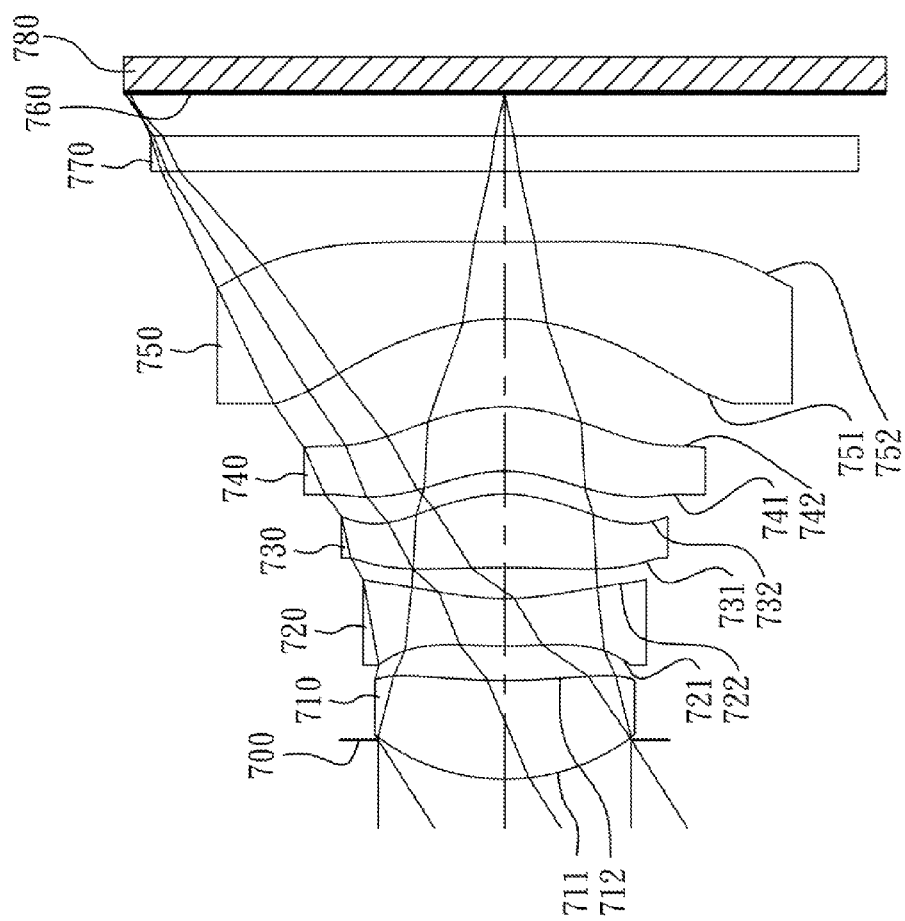
FIG. 13 is a schematic view of a photographing optical lens system according to the 7th embodiment of the present disclosure.
Figure 14:
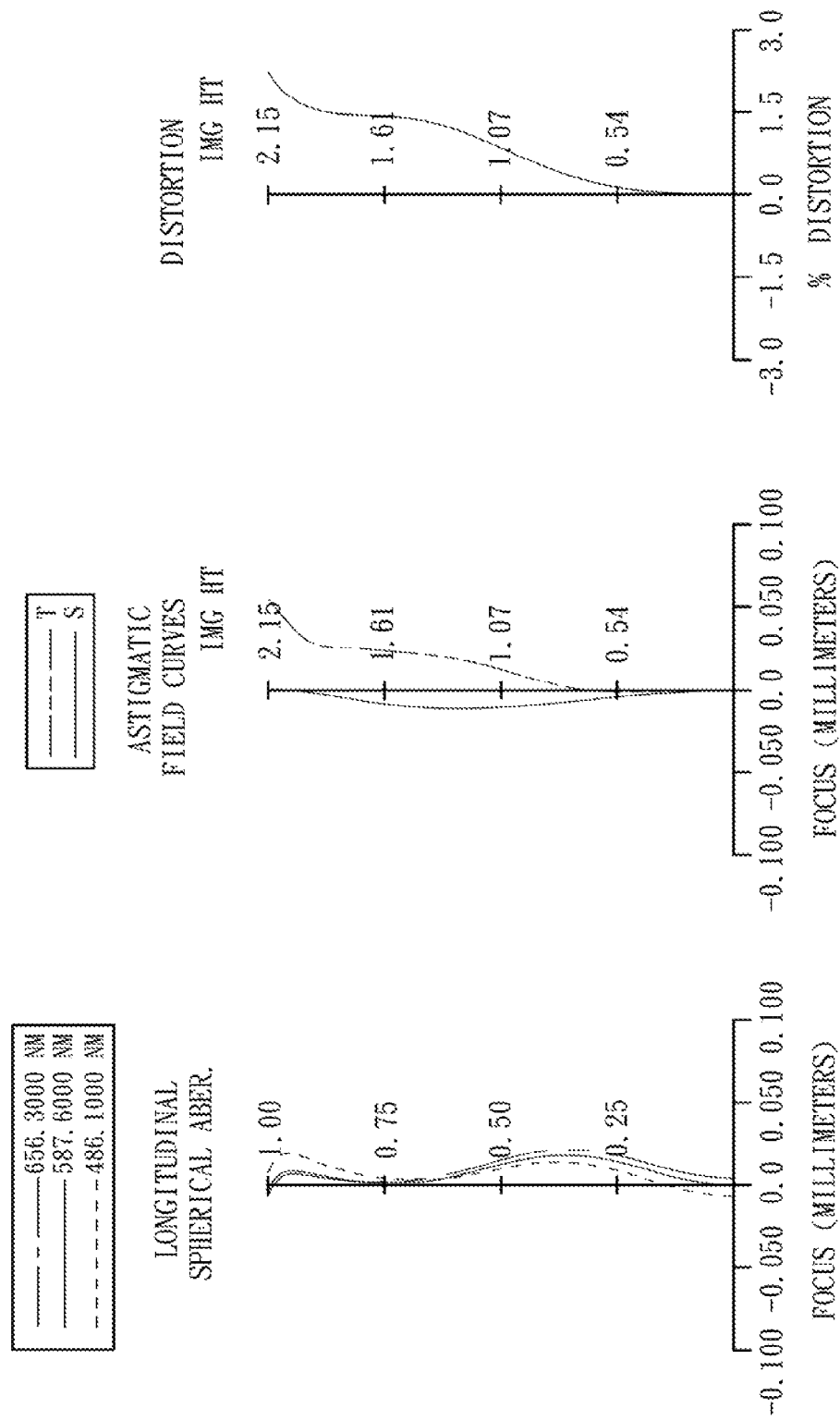
FIG. 14 shows spherical aberration curves, astigmatic field curves and a distortion curve of the photographing optical lens system according to the 7th embodiment.

FIG. 13 is a schematic view of a photographing optical lens system according to the 7th embodiment of the present disclosure. FIG. 14 shows spherical aberration curves, astigmatic field curves and a distortion curve of the photographing optical lens system according to the 7th embodiment. In FIG. 13, the photographing optical lens system includes, in order from an object side to an image side, an aperture stop 700, the first lens element 710, the second lens element 720, the third lens element 730, the fourth lens element 740, the fifth lens element 750, an IR-cut filter 770, an image plane 760 and an image sensor 780.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a convex object-side surface 721 and a concave image-side surface 722, and is made of plastic material. The object-side surface 721 and the image-side surface 722 of the second lens element 720 are aspheric.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a concave object-side surface 751 and a concave image-side surface 752, and is made of plastic material. The object-side surface 751 and the image-side surface 752 of the fifth lens element 750 are aspheric. Furthermore, the image-side surface 752 of the fifth lens element 750 changes from concave at the paraxial region to convex at the peripheral region.

The IR-cut filter 770 is made of glass, and located between the fifth lens element 750 and the image plane 760, and will not affect the focal length of the photographing optical lens system.

The detailed optical data of the 7th embodiment are shown in Table 13 and the aspheric surface data are shown in Table 14 below.

TABLE 13

7th Embodiment
f = 3.29 mm, Fno = 2.30, HFOV = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.223 | | | | |
| 2 | Lens 1 | 1.222 (ASP) | 0.561 | Plastic | 1.544 | 55.9 | 2.97 |
| 3 | | 4.203 (ASP) | 0.194 | | | | |
| 4 | Lens 2 | 4.583 (ASP) | 0.270 | Plastic | 1.640 | 23.3 | −3.96 |
| 5 | | 1.593 (ASP) | 0.171 | | | | |
| 6 | Lens 3 | −9.206 (ASP) | 0.420 | Plastic | 1.544 | 55.9 | 1.59 |
| 7 | | −0.801 (ASP) | 0.130 | | | | |
| 8 | Lens 4 | −0.766 (ASP) | 0.361 | Plastic | 1.640 | 23.3 | −24.70 |
| 9 | | −0.953 (ASP) | 0.499 | | | | |

TABLE 13-continued

7th Embodiment
f = 3.29 mm, Fno = 2.30, HFOV = 32.5 deg.

| Surface # | | Curvature Radius | Thickness | Material | Index | Abbe # | Focal length |
|---|---|---|---|---|---|---|---|
| 10 | Lens 5 | −1.218 (ASP) | 0.434 | Plastic | 1.544 | 55.9 | −2.14 |
| 11 | | 29.250 (ASP) | 0.400 | | | | |
| 12 | IR-cut filter | Plano | 0.200 | Glass | 1.517 | 64.2 | — |
| 13 | | Plano | 0.247 | | | | |
| 14 | Image | Plano | — | | | | |

Note:
Reference wavelength (d-line) is 587.6 nm.

TABLE 14

Aspheric Coefficients

| | Surface # | | | | |
|---|---|---|---|---|---|
| | 2 | 3 | 4 | 5 | 6 |
| k = | 2.0823E−01 | 2.2377E+00 | −2.0000E+01 | −4.2417E−01 | −1.0000E+00 |
| A4 = | −1.5601E−02 | −1.2814E−01 | −6.1915E−01 | −4.0119E−01 | 1.1033E−02 |
| A6 = | 1.6225E−01 | 2.4647E−02 | 3.2750E−01 | 3.7949E−01 | 4.1600E−01 |
| A8 = | −5.3252E−01 | −4.7650E−02 | −1.2497E+00 | −4.2583E−01 | −2.8706E−02 |
| A10 = | 9.0782E−01 | −6.9337E−01 | 1.2460E+00 | −1.8399E−01 | −4.2066E−01 |
| A12 = | −5.1456E−01 | 5.0095E−01 | 4.5299E−01 | 1.0461E+00 | −1.2194E+00 |
| A14 = | −2.5526E−01 | −5.8443E−01 | −1.2299E+00 | −3.8631E−01 | 3.4416E+00 |
| A16 = | | | | | −2.1947E+00 |

| | Surface # | | | | |
|---|---|---|---|---|---|
| | 7 | 8 | 9 | 10 | 11 |
| k = | −6.3745E−01 | −2.1912E+00 | −1.1168E+00 | −4.8785E+00 | −1.0000E+00 |
| A4 = | 6.9696E−01 | 7.7386E−01 | 3.7818E−01 | −1.1043E−01 | −5.0683E−02 |
| A6 = | −1.6015E−01 | −8.2303E−01 | −2.1561E−01 | 1.0374E−01 | 2.5786E−02 |
| A8 = | 1.5275E−01 | 8.4558E−01 | 1.7102E−01 | −1.1571E−01 | −2.9297E−02 |
| A10 = | 2.9951E−01 | −6.5923E−01 | 4.4316E−02 | 5.5927E−02 | 1.3300E−02 |
| A12 = | −3.7929E−01 | 1.4371E−01 | −8.1419E−02 | 2.9237E−02 | −1.6619E−03 |
| A14 = | 1.3950E−01 | 1.8843E−01 | −4.3827E−02 | −2.9896E−02 | −5.8056E−04 |
| A16 = | −1.1259E−01 | −1.2459E−01 | 3.3316E−02 | 6.3162E−03 | 1.5925E−04 |

In the image lens assembly according to the 7th embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 7th embodiment. Moreover, these parameters can be calculated from Table 13 and Table 14 as the following values and satisfy the following relationships:

| f (mm) | 3.29 | R9/R10 | −0.04 |
|---|---|---|---|
| Fno | 2.30 | f/f3 | 2.08 |
| HFOV (deg.) | 32.5 | f/f4 | −0.13 |
| V1 − V2 | 32.6 | f3/f1 | 0.53 |
| V1 − (V2 + V4) | 9.3 | (f/f4) + (f/f5) | −1.67 |
| (R5 + R6)/(R5 − R6) | 1.19 | SD/TD | 0.93 |
| R7/R6 | 0.96 | TTL/ImgH | 1.78 |

Moreover, in Table 13, the focal lengths of the first 710 through fifth lens element 750 satisfy the following relationship: |f4|>|fi|, i=1, 2, 3, 5.

8th Embodiment

Figure 15:
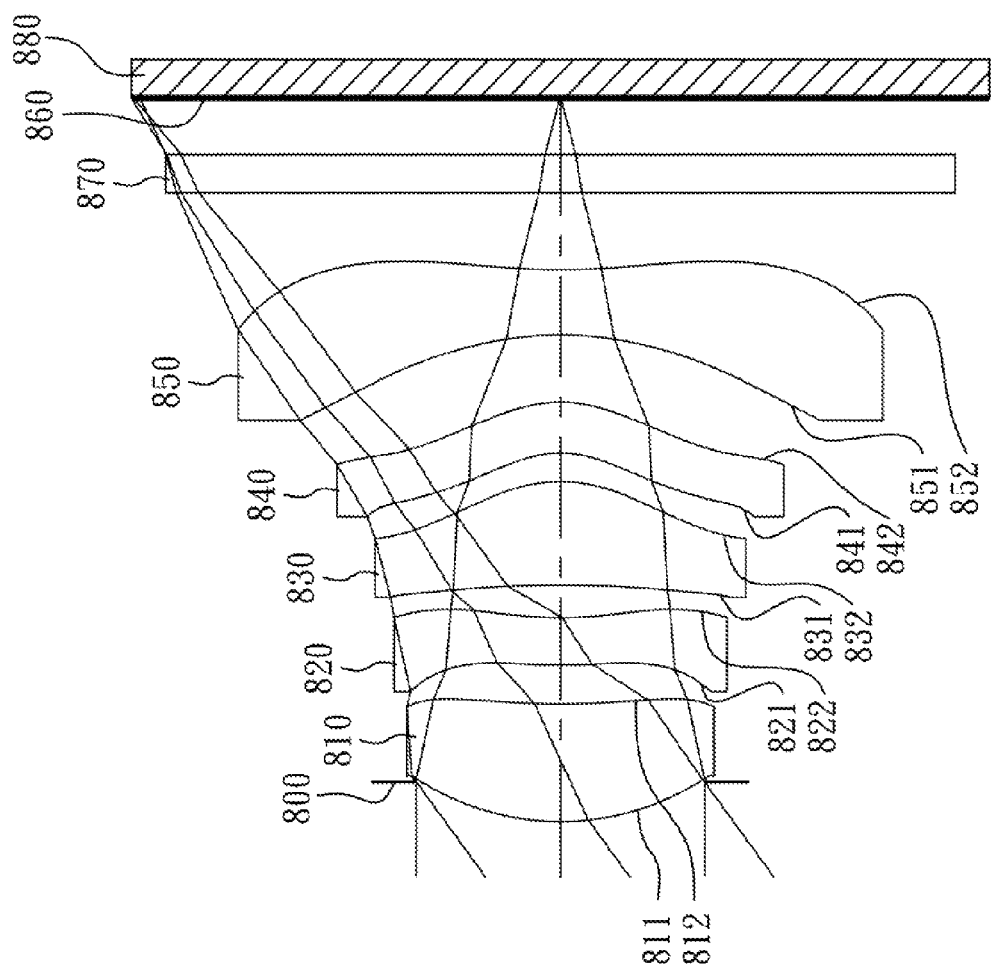
FIG. 15 is a schematic view of a photographing optical lens system according to the 8th embodiment of the present disclosure.
Figure 16:
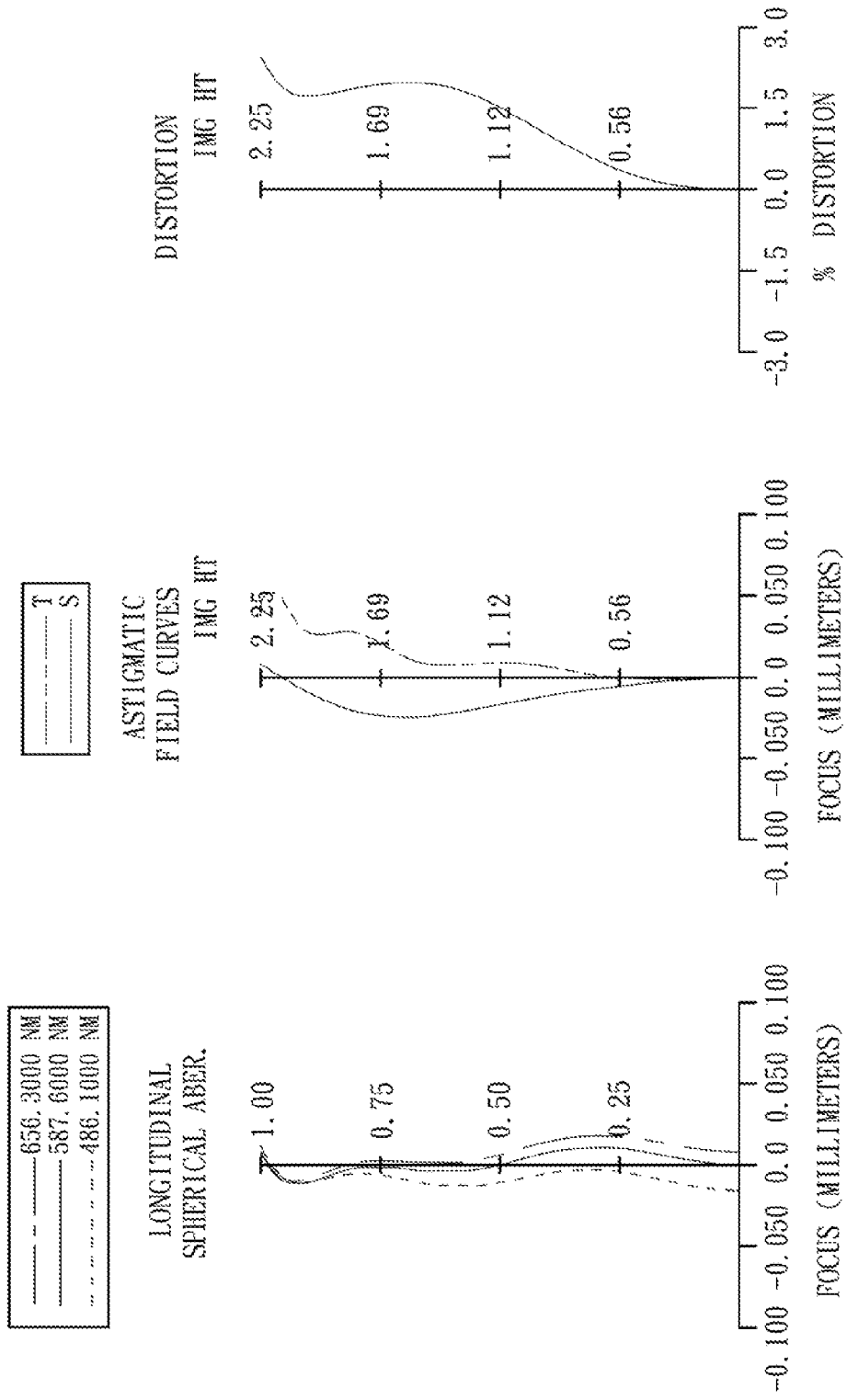
FIG. 16 shows spherical aberration curves, astigmatic field curves and a distortion curve of the photographing optical lens system according to the 8th embodiment.

FIG. 15 is a schematic view of a photographing optical lens system according to the 8th embodiment of the present disclosure. FIG. 16 shows spherical aberration curves, astigmatic field curves and a distortion curve of the photographing optical lens system according to the 8th embodiment. In FIG. 15, the photographing optical lens system includes, in order from an object side to an image side, an aperture stop 800, the first lens element 810, the second lens element 820, the third lens element 830, the fourth lens element 840, the fifth lens element 850, an IR-cut filter 870, an image plane 860 and an image sensor 880.

The first lens element 810 with positive refractive power has a convex object-side surface 811 and a concave image-side surface 812, and is made of glass material. The object-side surface 811 and the image-side surface 812 of the first lens element 810 are aspheric.

The second lens element 820 with negative refractive power has a convex object-side surface 821 and a concave image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The fifth lens element 850 with negative refractive power has a concave object-side surface 851 and a concave image-side surface 852, and is made of plastic material. The object-side surface 851 and the image-side surface 852 of the fifth lens element 850 are aspheric. Furthermore, the image-side surface 852 of the fifth lens element 850 changes from concave at the paraxial region to convex at the peripheral region.

The IR-cut filter 870 is made of glass, and located between the fifth lens element 850 and the image plane 860, and will not affect the focal length of the photographing optical lens system.

The detailed optical data of the 8th embodiment are shown in Table 15 and the aspheric surface data are shown in Table 16 below.

TABLE 15

8th Embodiment
f = 3.02 mm, Fno = 2.00, HFOV = 36.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.208 | | | | |
| 2 | Lens 1 | 1.371 (ASP) | 0.617 | Glass | 1.566 | 61.1 | 3.46 |
| 3 | | 3.832 (ASP) | 0.205 | | | | |
| 4 | Lens 2 | 3.440 (ASP) | 0.250 | Plastic | 1.640 | 23.3 | −7.80 |
| 5 | | 1.979 (ASP) | 0.168 | | | | |
| 6 | Lens 3 | −7.366 (ASP) | 0.544 | Plastic | 1.544 | 55.9 | 1.46 |
| 7 | | −0.737 (ASP) | 0.150 | | | | |
| 8 | Lens 4 | −0.544 (ASP) | 0.270 | Plastic | 1.640 | 23.3 | −26.51 |
| 9 | | −0.671 (ASP) | 0.351 | | | | |
| 10 | Lens 5 | −1.540 (ASP) | 0.345 | Plastic | 1.544 | 55.9 | −1.97 |
| 11 | | 3.789 (ASP) | 0.400 | | | | |
| 12 | IR-cut filter | Plano | 0.200 | Glass | 1.517 | 64.2 | — |
| 13 | | Plano | 0.299 | | | | |
| 14 | Image | Plano | — | | | | |

Note:
Reference wavelength (d-line) is 587.6 nm.

TABLE 16

Aspheric Coefficients

| | Surface # | | | | |
|---|---|---|---|---|---|
| | 2 | 3 | 4 | 5 | 6 |
| k = | 1.4146E−01 | −1.0000E+00 | −1.0886E+01 | −2.6522E+00 | −5.0219E+00 |
| A4 = | −3.1410E−02 | −1.6154E−01 | −5.7340E−01 | −4.1738E−01 | −1.1724E−01 |
| A6 = | 2.0453E−01 | 1.1064E−01 | 2.7745E−01 | 3.2427E−01 | 2.7039E−01 |
| A8 = | −7.2649E−01 | −3.3423E−01 | −1.3298E+00 | −5.8923E−01 | 8.3476E−02 |
| A10 = | 1.0597E+00 | −2.6321E−01 | 1.5761E+00 | 1.6144E−01 | −3.9186E−01 |
| A12 = | −3.5984E−01 | 8.7194E−01 | 4.6895E−01 | 1.0373E+00 | −1.2828E+00 |
| A14 = | −3.8798E−01 | −8.1092E−01 | −1.1689E+00 | −8.2685E−01 | 3.4262E+00 |
| A16 = | | | | | −2.1683E+00 |

| | Surface # | | | | |
|---|---|---|---|---|---|
| | 7 | 8 | 9 | 10 | 11 |
| k = | −5.6961E−01 | −2.1590E+00 | −2.3135E+00 | −1.7042E+01 | −2.9402E−01 |
| A4 = | 6.8319E−01 | 7.5620E−01 | 3.7067E−01 | −1.5086E−01 | −1.4055E−01 |
| A6 = | −2.3378E−01 | −8.5780E−01 | −3.1413E−01 | 1.0374E−01 | 6.7994E−02 |
| A8 = | 8.5827E−02 | 7.8681E−01 | 1.8471E−01 | −9.3730E−02 | −3.9761E−02 |
| A10 = | 2.9671E−01 | −6.5290E−01 | 5.6628E−02 | 4.8269E−02 | 1.3290E−02 |
| A12 = | −3.6318E−01 | 2.0263E−01 | −7.8348E−02 | 2.5056E−02 | −1.3013E−03 |
| A14 = | 1.8045E−01 | 2.0209E−01 | −4.4308E−02 | −3.0686E−02 | −5.1840E−04 |
| A16 = | −1.7570E−02 | −1.8528E−01 | 3.2821E−02 | 7.2530E−03 | 1.0914E−04 |

In the image lens assembly according to the 8th embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.02 | R9/R10 | −0.41 |
| Fno | 2.00 | f/f3 | 2.07 |
| HFOV (deg.) | 36.0 | f/f4 | −0.11 |
| V1 − V2 | 37.8 | f3/f1 | 0.42 |
| V1 − (V2 + V4) | 14.5 | (f/f4) + (f/f5) | −1.65 |
| (R5 + R6)/(R5 − R6) | 1.22 | SD/TD | 0.93 |
| R7/R6 | 0.74 | TTL/ImgH | 1.66 |

Moreover, in Table 15, the focal lengths of the first 810 through fifth lens element 850 satisfy the following relationship: $|f4|>|fi|$, i=1, 2, 3, 5.

9th Embodiment

Figure 17:
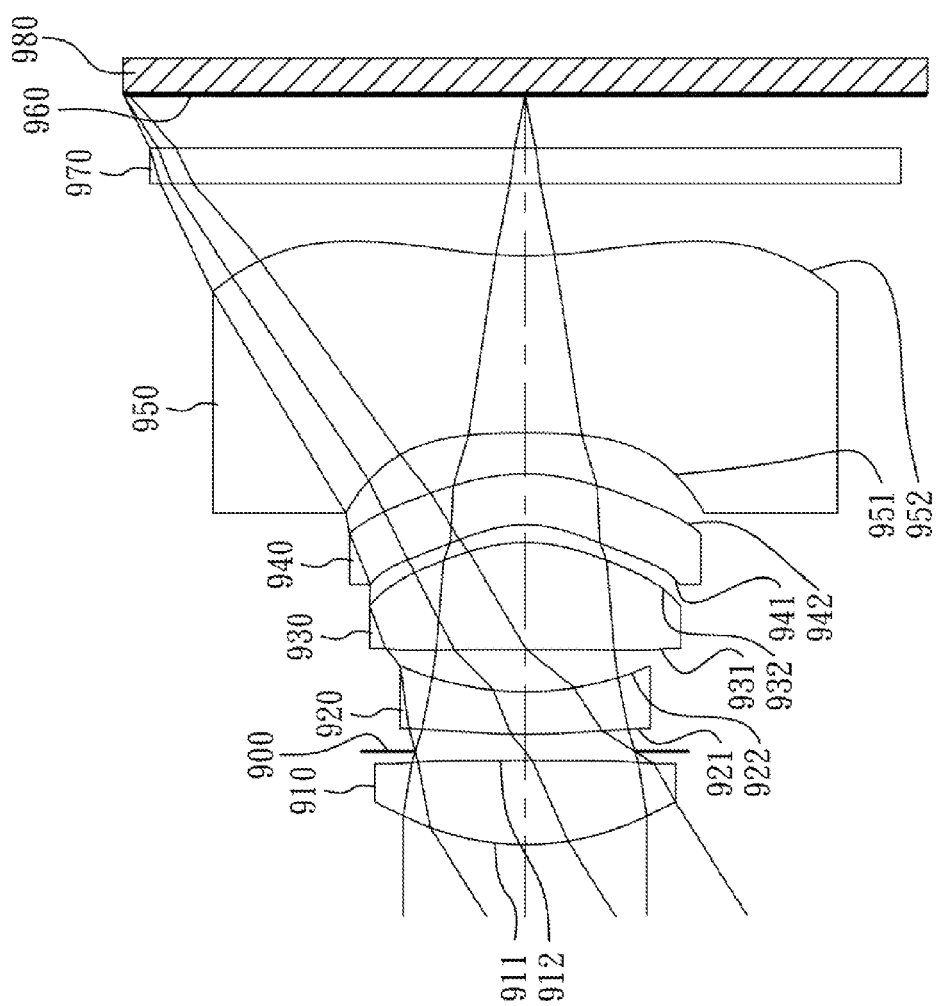
FIG. 17 is a schematic view of a photographing optical lens system according to the 9th embodiment of the present disclosure.
Figure 18:
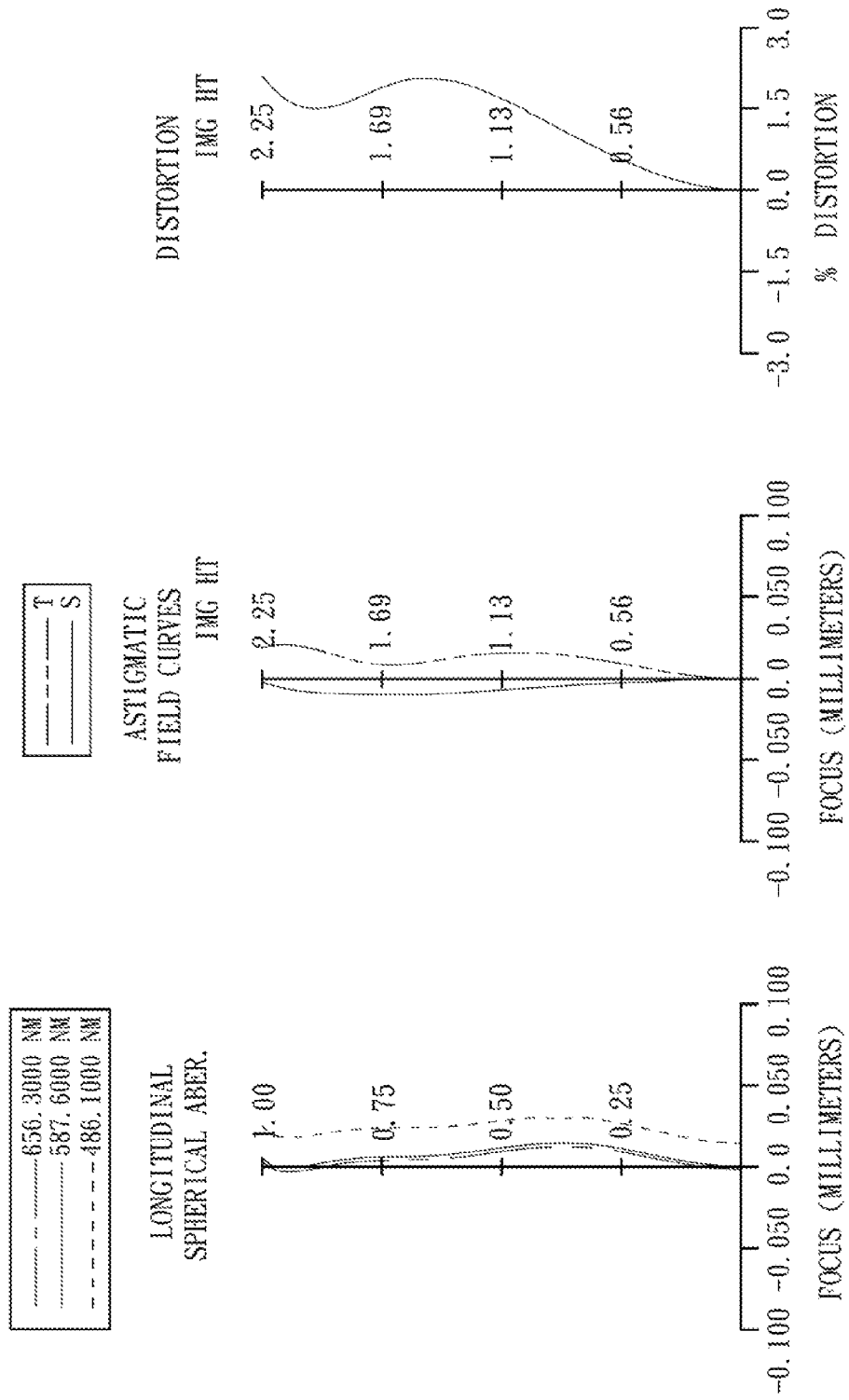
FIG. 18 shows spherical aberration curves, astigmatic field curves and a distortion curve of the photographing optical lens system according to the 9th embodiment.

FIG. 17 is a schematic view of a photographing optical lens system according to the 9th embodiment of the present disclosure. FIG. 18 shows spherical aberration curves, astigmatic field curves and a distortion curve of the photographing optical lens system according to the 9th embodiment. In FIG. 17, the photographing optical lens system includes, in order from an object side to an image side, the first lens element 910, an aperture stop 900, the second lens element 920, the third lens element 930, the fourth lens element 940, the fifth lens element 950, an IR-cut filter 970, an image plane 960 and an image sensor 980.

The first lens element 910 with positive refractive power has a convex object-side surface 911 and a convex image-side surface 912, and is made of plastic material. The object-side surface 911 and the image-side surface 912 of the first lens element 910 are aspheric.

The second lens element 920 with negative refractive power has a convex object-side surface 921 and a concave image-side surface 922, and is made of plastic material. The object-side surface 921 and the image-side surface 922 of the second lens element 920 are aspheric.

The third lens element 930 with positive refractive power has a convex object-side surface 931 and a convex image-side surface 932, and is made of plastic material. The object-side surface 931 and the image-side surface 932 of the third lens element 930 are aspheric.

The fourth lens element 940 with negative refractive power has a concave object-side surface 941 and a convex image-side surface 942, and is made of plastic material. The object-side surface 941 and the image-side surface 942 of the fourth lens element 940 are aspheric.

The fifth lens element 950 with negative refractive power has a concave object-side surface 951 and a concave image-side surface 952, and is made of plastic material. The object-side surface 951 and the image-side surface 952 of the fifth lens element 950 are aspheric. Furthermore, the image-side surface 952 of the fifth lens element 950 changes from concave at the paraxial region to convex at the peripheral region.

The IR-cut filter 970 is made of glass, and located between the fifth lens element 950 and the image plane 960, and will not affect the focal length of the photographing optical lens system.

The detailed optical data of the 9th embodiment are shown in Table 17 and the aspheric surface data are shown in Table 18 below.

TABLE 17

9th Embodiment
f = 3.48 mm, Fno = 2.55, HFOV = 32.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.479 (ASP) | 0.472 | Plastic | 1.544 | 55.9 | 2.68 |
| 2 | | −89.285 (ASP) | 0.049 | | | | |
| 3 | Ape. Stop | Plano | 0.097 | | | | |
| 4 | Lens 2 | 3.464 (ASP) | 0.240 | Plastic | 1.650 | 21.4 | −4.83 |
| 5 | | 1.601 (ASP) | 0.235 | | | | |
| 6 | Lens 3 | 75.536 (ASP) | 0.598 | Plastic | 1.544 | 55.9 | 1.67 |
| 7 | | −0.916 (ASP) | 0.100 | | | | |
| 8 | Lens 4 | −0.677 (ASP) | 0.288 | Plastic | 1.640 | 23.3 | −3.88 |
| 9 | | −1.086 (ASP) | 0.227 | | | | |
| 10 | Lens 5 | −4.991 (ASP) | 0.994 | Plastic | 1.535 | 56.3 | −2.93 |
| 11 | | 2.439 (ASP) | 0.400 | | | | |
| 12 | IR-cut filter | Plano | 0.200 | Glass | 1.517 | 64.2 | — |
| 13 | | Plano | 0.302 | | | | |
| 14 | Image | Plano | — | | | | |

Note:
Reference wavelength (d-line) is 587.6 nm.

TABLE 18

Aspheric Coefficients

| | Surface # | | | | |
|---|---|---|---|---|---|
| | 1 | 2 | 4 | 5 | 6 |
| k = | 5.8411E−01 | −3.0000E+01 | −1.0000E+00 | −8.9776E−01 | −3.0000E+01 |
| A4 = | −5.0848E−02 | −9.2156E−02 | −3.0263E−01 | −2.4433E−01 | −1.1386E−01 |
| A6 = | 1.1588E−01 | 1.3583E−01 | 6.2786E−01 | 6.6186E−01 | 5.6414E−02 |
| A8 = | −6.1228E−01 | 6.5659E−03 | −8.1639E−01 | −5.6728E−01 | 4.7084E−01 |
| A10 = | 1.2597E+00 | −3.4733E−01 | 5.7992E−01 | −9.7282E−03 | −2.6291E−01 |
| A12 = | −1.3152E+00 | −1.9133E−01 | −9.4236E−01 | 4.5304E−01 | −1.4649E+00 |
| A14 = | 4.1368E−01 | 5.8998E−01 | 6.8643E−01 | −2.0943E−01 | 3.1063E+00 |

TABLE 18-continued

Aspheric Coefficients

A16 = -1.7786E+00

| | Surface # | | | | |
|---|---|---|---|---|---|
| | 7 | 8 | 9 | 10 | 11 |
| k = | -1.9757E-01 | -2.1876E+00 | -1.2172E+00 | -1.2115E+00 | -1.2184E+01 |
| A4 = | 4.7703E-01 | 5.6215E-01 | 3.3979E-01 | -3.3789E-01 | -1.0711E-01 |
| A6 = | -5.6435E-02 | -6.5062E-01 | -3.8666E-01 | 1.0374E-01 | 5.2520E-02 |
| A8 = | -9.6119E-02 | 5.9303E-01 | 1.7814E-01 | -8.1606E-02 | -2.5590E-02 |
| A10 = | 1.0773E-01 | -8.3119E-01 | 5.2959E-02 | -5.1949E-02 | 6.7053E-03 |
| A12 = | -6.0098E-01 | 2.8397E-01 | -9.7971E-02 | 2.7827E-02 | -8.7862E-04 |
| A14 = | 1.2384E-01 | 2.6592E-01 | -4.9770E-02 | -1.0880E-02 | 2.7541E-05 |
| A16 = | 3.5984E-01 | -4.3133E-01 | 5.3655E-02 | 6.7402E-03 | 5.3569E-06 |

In the image lens assembly according to the 9th embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 9th embodiment. Moreover, these parameters can be calculated from Table 17 and Table 18 as the following values and satisfy the following relationships:

| f (mm) | 3.48 | R9/R10 | -2.05 |
|---|---|---|---|
| Fno | 2.55 | f/f3 | 2.08 |
| HFOV (deg.) | 32.3 | f/f4 | -0.90 |
| V1 - V2 | 34.5 | f3/f1 | 0.62 |
| V1 - (V2 + V4) | 11.2 | (f/f4) + (f/f5) | -2.08 |
| (R5 + R6)/(R5 - R6) | 0.98 | SD/TD | 0.84 |
| R7/R6 | 0.74 | TTL/ImgH | 1.84 |

Moreover, in Table 17, the focal lengths of the first 910 through fifth lens element 950 satisfy the following relationship: $|f4|>|fi|$, i=1, 2, 3, 5.

10th Embodiment

Figure 19:
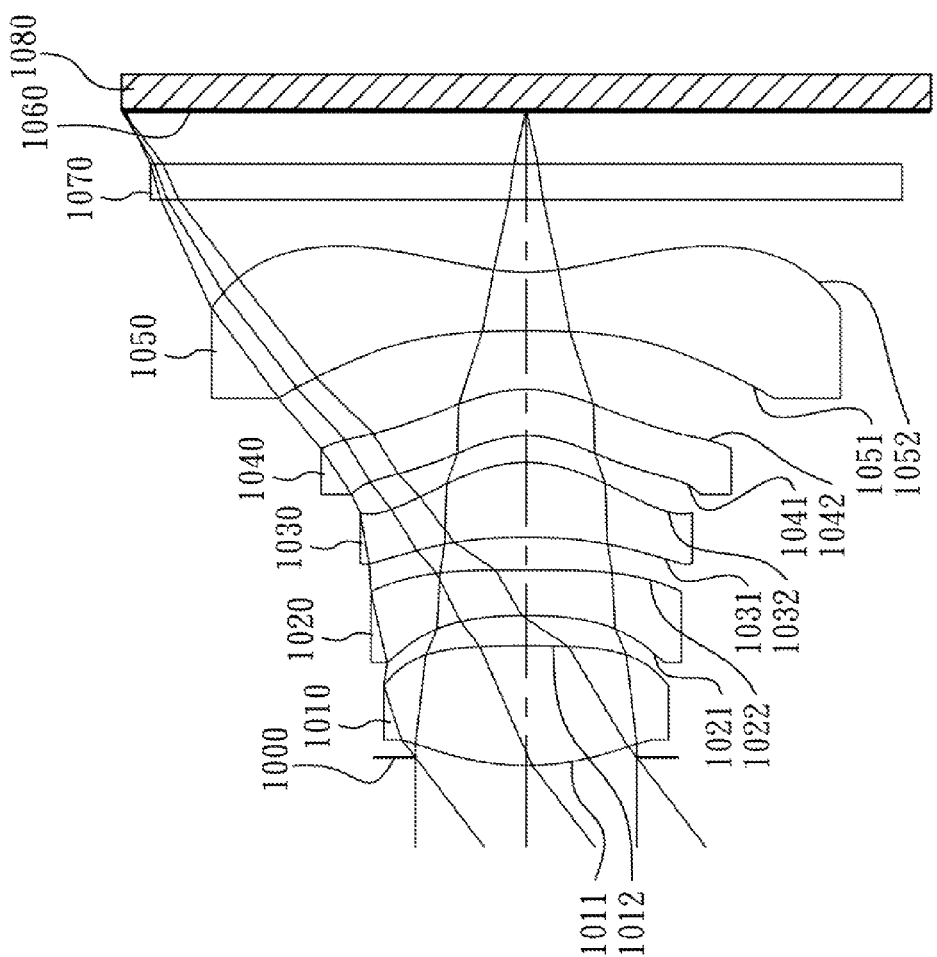
FIG. 19 is a schematic view of a photographing optical lens system according to the 10th embodiment of the present disclosure.
Figure 20:
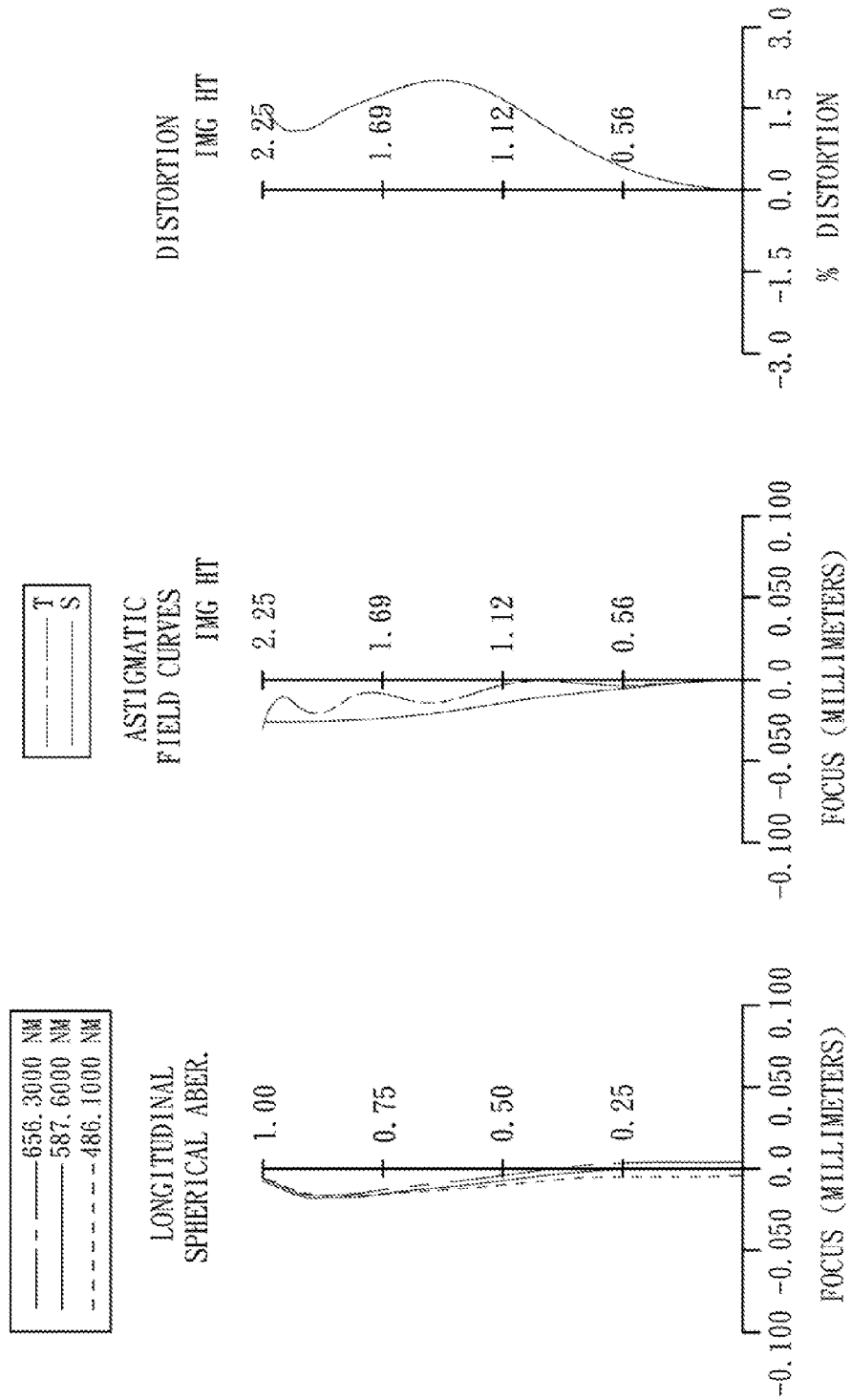
FIG. 20 shows spherical aberration curves, astigmatic field curves and a distortion curve of the photographing optical lens system according to the 10th embodiment.

FIG. 19 is a schematic view of a photographing optical lens system according to the 10th embodiment of the present disclosure. FIG. 20 shows spherical aberration curves, astigmatic field curves and a distortion curve of the photographing optical lens system according to the 10th embodiment. In FIG. 19, the photographing optical lens system includes, in order from an object side to an image side, an aperture stop 1000, the first lens element 1010, the second lens element 1020, the third lens element 1030, the fourth lens element 1040, the fifth lens element 1050, an IR-cut filter 1070, an image plane 1060 and an image sensor 1080.

The first lens element 1010 with positive refractive power has a convex object-side surface 1011 and a convex image-side surface 1012, and is made of plastic material. The object-side surface 1011 and the image-side surface 1012 of the first lens element 1010 are aspheric.

The second lens element 1020 with negative refractive power has a concave object-side surface 1021 and a convex image-side surface 1022, and is made of plastic material. The object-side surface 1021 and the image-side surface 1022 of the second lens element 1020 are aspheric.

The third lens element 1030 with positive refractive power has a concave object-side surface 1031 and a convex image-side surface 1032, and is made of plastic material. The object-side surface 1031 and the image-side surface 1032 of the third lens element 1030 are aspheric.

The fourth lens element 1040 with negative refractive power has a concave object-side surface 1041 and a convex image-side surface 1042, and is made of plastic material. The object-side surface 1041 and the image-side surface 1042 of the fourth lens element 1040 are aspheric.

The fifth lens element 1050 with negative refractive power has a concave object-side surface 1051 and a concave image-side surface 1052, and is made of plastic material. The object-side surface 1051 and the image-side surface 1052 of the fifth lens element 1050 are aspheric. Furthermore, the image-side surface 1052 of the fifth lens element 1050 changes from concave at the paraxial region to convex at the peripheral region.

The IR-cut filter 1070 is made of glass, and located between the fifth lens element 1050 and the image plane 1060, and will not affect the focal length of the photographing optical lens system.

The detailed optical data of the 10th embodiment are shown in Table 19 and the aspheric surface data are shown in Table 20 below.

TABLE 19

10th Embodiment
f = 2.89 mm, Fno = 2.35, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.044 | | | | |
| 2 | Lens 1 | 1.488 (ASP) | 0.667 | Plastic | 1.544 | 55.9 | 2.37 |
| 3 | | -8.097 (ASP) | 0.171 | | | | |
| 4 | Lens 2 | -2.691 (ASP) | 0.250 | Plastic | 1.640 | 23.3 | -4.48 |
| 5 | | -45.454 (ASP) | 0.183 | | | | |
| 6 | Lens 3 | -3.270 (ASP) | 0.417 | Plastic | 1.544 | 55.9 | 1.60 |
| 7 | | -0.716 (ASP) | 0.150 | | | | |
| 8 | Lens 4 | -0.577 (ASP) | 0.260 | Plastic | 1.650 | 21.4 | -16.33 |

TABLE 19-continued

10th Embodiment
f = 2.89 mm, Fno = 2.35, HFOV = 37.6 deg.

| Surface # | | Curvature Radius | Thickness | Material | Index | Abbe # | Focal length |
|---|---|---|---|---|---|---|---|
| 9 | | −0.719 (ASP) | 0.323 | | | | |
| 10 | Lens 5 | −6.070 (ASP) | 0.329 | Plastic | 1.535 | 56.3 | −1.90 |
| 11 | | 1.244 (ASP) | 0.400 | | | | |
| 12 | IR-cut filter | Plano | 0.200 | Glass | 1.517 | 64.2 | — |
| 13 | | Plano | 0.299 | | | | |
| 14 | Image | Plano | — | | | | |

Note:
Reference wavelength (d-line) is 587.6 nm.

TABLE 20

Aspheric Coefficients

| | Surface # | | | | |
|---|---|---|---|---|---|
| | 2 | 3 | 4 | 5 | 6 |
| k = | −1.3314E−01 | −1.0000E+00 | −1.0000E+00 | −1.0000E+00 | −1.0000E+00 |
| A4 = | −3.1450E−02 | −2.7115E−01 | −5.2289E−01 | −3.0427E−01 | −2.0767E−01 |
| A6 = | 4.4657E−02 | −7.0868E−02 | 3.8551E−01 | 3.8703E−01 | 1.9976E−01 |
| A8 = | −6.1509E−01 | −5.2210E−01 | −1.3528E+00 | −6.5783E−01 | 1.8066E−01 |
| A10 = | 1.3180E+00 | −1.4708E−01 | 1.5080E+00 | 1.2567E−01 | −2.8129E−01 |
| A12 = | −1.1483E+00 | 1.3608E+00 | 4.0921E−01 | 1.0951E+00 | −1.1903E+00 |
| A14 = | −1.6342E+00 | −1.2107E+00 | −4.5937E−01 | −9.0948E−01 | 3.4330E+00 |
| A16 = | | | | | −2.3620E+00 |

| | Surface # | | | | |
|---|---|---|---|---|---|
| | 7 | 8 | 9 | 10 | 11 |
| k = | −5.0197E−01 | −2.1865E+00 | −2.3794E+00 | −8.9434E−01 | −9.8599E+00 |
| A4 = | 6.9219E−01 | 7.6563E−01 | 3.7611E−01 | −1.6609E−01 | −1.2727E−01 |
| A6 = | −2.0408E−01 | −8.8251E−01 | −3.1599E−01 | 1.0374E−01 | 7.7821E−02 |
| A8 = | 1.2290E−01 | 7.3659E−01 | 1.7677E−01 | −8.4208E−02 | −4.5949E−02 |
| A10 = | 3.5030E−01 | −6.4094E−01 | 4.6446E−02 | 4.7148E−02 | 1.4083E−02 |
| A12 = | −3.1276E−01 | 2.5913E−01 | −8.2029E−02 | 2.3663E−02 | −1.0027E−03 |
| A14 = | 2.2792E−01 | 1.9423E−01 | −4.3235E−02 | −3.1075E−02 | −5.0648E−04 |
| A16 = | 2.9514E−02 | −2.4404E−01 | 3.6084E−02 | 7.4468E−03 | 8.3624E−05 |

In the image lens assembly according to the 10th embodiment, the definitions of f, Fno, HFOV, V1, V2, V4, R5, R6, R7, R9, R10, f1, f3, f4, f5, SD, TD, TTL and ImgH are the same as those stated in the 1st embodiment with corresponding values for the 10th embodiment. Moreover, these parameters can be calculated from Table 19 and Table 20 as the following values and satisfy the following relationships:

| f (mm) | 2.89 | R9/R10 | −4.88 |
|---|---|---|---|
| Fno | 2.35 | f/f3 | 1.81 |
| HFOV (deg.) | 37.6 | f/f4 | −0.18 |
| V1 − V2 | 32.6 | f3/f1 | 0.67 |
| V1 − (V2 + V4) | 11.2 | (f/f4) + (f/f5) | −1.70 |
| (R5 + R6)/(R5 − R6) | 1.56 | SD/TD | 0.98 |
| R7/R6 | 0.81 | TTL/ImgH | 1.59 |

Moreover, in Table 19, the focal lengths of the first 1010 through fifth lens element 1050 satisfy the following relationship: $|f4| > |fi|$, $i = 1, 2, 3, 5$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing optical lens system comprising, in order from an object side to an image side:
   a first lens element with positive refractive power having a convex object-side surface;
   a second lens element with negative refractive power;
   a third lens element with refractive power;
   a fourth lens element with negative refractive power made of plastic material, and having a concave object-side surface and a convex image-side surface, wherein at least one of the object-side surface and the image-side surface of the fourth lens lement is aspheric; and
   a fifth lens element with negative refractive power made of plastic material, and having a concave object-side surface and a concave image-side surface, wherein at least one of the object-side surface and the image-side surface of the fifth lens element is aspheric, and the image-side surface of the fifth lens element changes from concave at the paraxial region to convex at the peripheral region;
   wherein the photographing optical lens system has a total of five lens elements with refractive power, a curvature radius of the object-side surface of the fifth lens element is R9, a curvature radius of the image-side surface of the fifth lens element is R10, a focal length of the photographing optical lens system is f, a focal length of the fourth lens element is f4, a focal length of the fifth lens element is f5, and the following relationships are satisfied:

$-10 < R9/R10 < 0;$ $-2.8 < (f/f4) + (f/f5) < -0.85;$ and $-1.1 < f/f4 < 0.$

2. The photographing optical lens system of claim 1, wherein at least one of an object-side surface and an image-side surface of the second lens element is aspheric, and the third lens element with positive refractive power has at least one of an object-side surface and an image-side surface being aspheric.

3. The photographing optical lens system of claim 2, wherein a curvature radius of the object-side surface of the third lens element is R5, a curvature radius of the image-side surface of the third lens element is R6, and the following relationship is satisfied:

$0.4 < (R5+R6)/(R5-R6) < 2.5.$

4. The photographing optical lens system of claim 2, wherein the focal length of the photographing optical lens system is f, a focal length of the third lens element is f3, and the following relationship is satisfied:

$1.1 < f/f3 < 2.5.$

5. The photographing optical lens system of claim 2, further comprising:
a stop, wherein an axial distance between the stop and the image-side surface of the fifth lens element is SD, an axial distance between the object-side surface of the first lens element and the image-side surface of the fifth lens element is TD, and the following relationship is satisfied:

$0.65 < SD/TD < 1.15.$

6. The photographing optical lens system of claim 5, wherein a focal length of the first lens element is f1, a focal length of the third lens element is f3, and the following relationship satisfied:

$0.3 < f3/f1 < 1.2.$

7. The photographing optical lens system of claim 5, wherein the curvature radius of the object-side surface of the fifth lens element is R9, the curvature radius of the image-side surface of the fifth lens element is R10, and the following relationship is satisfied:

$-7.0 < R9/R10 < 0.$

8. The photographing optical lens system of claim 3, wherein an Abbe number of the first lens element is V1, an Abbe number of the second lens element is V2, and the following relationship is satisfied:

$27 < V1 - V2 < 45.$

9. The photographing optical lens system of claim 3, wherein an Abbe number of the first lens element is V1, an Abbe number of the second lens element is V2, an Abbe number of the fourth lens element is V4, and the following relationship is satisfied:

$-10 < V1 - (V2+V4) < 23.$

10. The photographing optical lens system of claim 2, wherein the focal length of the fourth lens element is f4, fi is a focal length of the i-th lens element, wherein i is 1, 2, 3 or 5, and the following relationship is satisfied:

$|f4| > |fi|, i=1, 2, 3, 5.$

11. The photographing optical lens system of claim 2, wherein the curvature radius of the object-side surface of the fifth lens element is R9, the curvature radius of the image-side surface of the fifth lens element is R10, and the following relationship is satisfied:

$-5.0 < R9/R10 < 0.$

12. The photographing optical lens system of claim 2, wherein a curvature radius of the image-side surface of the third lens element is R6, a curvature radius of the object-side surface of the fourth lens element is R7, and the following relationship is satisfied:

$0 < R7/R6 < 0.9.$

13. The photographing optical lens system of claim 1, wherein an axial distance between the object-side surface of the first lens element and an image plane is TTL, a maximum image height of the photographing optical lens system is ImgH, and the following relationship is satisfied:

$TTL/ImgH < 1.9.$

14. A photographing optical lens system comprising, in order from an object side to an image side:
a first lens element with positive refractive power having a convex object-side surface;
a second lens element with negative refractive power;
a third lens element with positive refractive power;
a fourth lens element with negative refractive power made of plastic material, and having a concave object-side surface and a convex image-side surface, wherein at least one of the object-side surface and the image-side surface of the fourth lens element is aspheric; and
a fifth lens element with negative refractive power made of plastic material, and having a concave object-side surface and a concave image-side surface, wherein at least one of the object-side surface and the image-side surface of the fifth lens element is aspheric, and the image-side surface of the fifth lens element changes from concave at the paraxial region to convex at the peripheral region;
wherein the photographing optical lens system has a total of five lens elements with refractive power, a curvature radius of the object-side surface of the fifth lens element is R9, a curvature radius of the image-side surface of the fifth lens element is R10, a focal length of the first lens element is f1, a focal length of the third lens element is f3, a focal length of the photographing optical lens system is f, a focal length of the fourth lens element is f4, and the following relationships are satisfied:

$-10 < R9/R10 < 0;$ $0.3 < f3/f1 < 1.2;$ and $-1.1 < f/f4 < 0.$

15. The photographing optical lens system of claim 14, wherein the third lens element has a convex image-side surface, a curvature radius of the object-side surface of the third lens element is R5, a curvature radius of the image-side surface of the third lens element is R6, and the following relationship is satisfied:

$0.4 < (R5+R6)/(R5-R6) < 2.5.$

16. The photographing optical lens system of claim 14, wherein the focal length of the photographing optical lens system is f, the focal length of the fourth lens element is f4, a focal length of the fifth lens element is f5, and the following relationship is satisfied:

$$-2.8 < (f/f4) + (f/f5) < -0.85.$$

17. The photographing optical lens system of claim 14, wherein the focal length of the fourth lens element is f4, fi is a focal length of the i-th lens element, wherein i is 1, 2, 3 or 5, and the following relationship is satisfied:

$$|f4| > |fi|, i=1, 2, 3, 5.$$

18. The photographing optical lens system of claim 14, wherein the curvature radius of the object-side surface of the fifth lens element is R9, the curvature radius of the image-side surface of the fifth lens element is R10, and the following relationship is satisfied:

$$-5.0 < R9R10 < 0.$$

19. The photographing optical lens system of claim 14, wherein a curvature radius of the image-side surface of the third lens element is R6, a curvature radius of the object-side surface of the fourth lens element is R7, and the following relationship is satisfied:

$$0 < R7/R6 < 0.9.$$

20. The photographing optical lens system of claim 14, wherein the focal length of the photographing optical lens system is f, the focal length of the third lens element is f3, and the following relationship is satisfied:

$$1.1 < f/f3 < 2.4.$$

21. The photographing optical lens system of claim 14, wherein an Abbe number of the first lens element is V1, an Abbe number of the second lens element is V2, an Abbe number of the fourth lens element is V4, and the following relationship is satisfied:

$$-10 < V1 - (V2 + V4) < 23.$$

22. The photographing optical lens system of claim 14, wherein the first through fifth lens element are made of plastid material, and the object-side surface and the image-side surface of the first through fifth lens element are aspheric.

\* \* \* \* \*

UNITED STATES PATENT AND TRADEMARK OFFICE
CERTIFICATE OF CORRECTION

PATENT NO. : 8,817,385 B2
APPLICATION NO. : 13/615630
DATED : August 26, 2014
INVENTOR(S) : Tsung-Han Tsai et al.

It is certified that error appears in the above-identified patent and that said Letters Patent is hereby corrected as shown below:

In the Claims (1) In column 34, line 57, Claim 1 of the issued patent reads as "... surface of the fourth lens lement is ...", but it should read as "... surface of the fourth lens element is ...".
(2) In column 35, line 45, Claim 6 of the issued patent reads as "0.3 < f3f/1 < 1.2", but it should read as "0.3 < f3/f1 < 1.2".
(3) In column 37, line 19, Claim 18 of the issued patent reads as "-5.0 < R9R10 < 0", but it should read as "-5.0 <R9/R10 < 0".
(4) In column 38, line 18, Claim 22 of the issued patent reads as "... made of plastid material, ...", but it should read as "... made of plastic material, ...".

Signed and Sealed this
Twenty-third Day of December, 2014

Michelle K. Lee
*Deputy Director of the United States Patent and Trademark Office*